(12) United States Patent
Kishikawa et al.

(10) Patent No.: US 10,843,286 B2
(45) Date of Patent: Nov. 24, 2020

(54) WELDING DEVICE

(71) Applicant: Kobe Steel, Ltd., Kobe (JP)

(72) Inventors: Hirohisa Kishikawa, Kanagawa (JP);
Hiroshi Matsumura, Tokyo (JP);
Shigeto Takada, Kanagawa (JP); Kenji Sadahiro, Kanagawa (JP); Shun Izutani, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 39 days.

(21) Appl. No.: 16/319,858

(22) PCT Filed: Jul. 18, 2017

(86) PCT No.: PCT/JP2017/025931
§ 371 (c)(1),
(2) Date: Jan. 23, 2019

(87) PCT Pub. No.: WO2018/021090
PCT Pub. Date: Feb. 1, 2018

(65) Prior Publication Data
US 2019/0270157 A1    Sep. 5, 2019

(30) Foreign Application Priority Data

Jul. 27, 2016    (JP) ................................ 2016-147868

(51) Int. Cl.
*B23K 9/095* (2006.01)
*B23K 9/00* (2006.01)
(Continued)

(52) U.S. Cl.
CPC .............. *B23K 9/0956* (2013.01); *B23K 9/00* (2013.01); *B23K 9/0026* (2013.01); *B23K 9/095* (2013.01);
(Continued)

(58) Field of Classification Search
CPC .. B23K 9/095; B23K 9/0956; B23K 2101/24; B23K 37/0538; B23K 37/0443
See application file for complete search history.

(56) References Cited

U.S. PATENT DOCUMENTS 4,816,640 A     3/1989 Sugitani et al.
6,642,483 B1 *  11/2003 Koga .................. B23K 9/0953
                                              219/130.01
(Continued)

FOREIGN PATENT DOCUMENTS

CN        1031343 A      3/1989
CN      103357986 A     10/2013
(Continued)

OTHER PUBLICATIONS

Machine translation of Japan Patent document No. 2013-202,673-A, Apr. 2020.*

(Continued)

*Primary Examiner* — Geoffrey S Evans
(74) *Attorney, Agent, or Firm* — Oblon, McClelland, Maier & Neustadt, L.L.P.

(57) ABSTRACT

A welding device for automatically welding a workpiece by a welding robot using a welding wire includes a welding control device that controls operation and welding work of the welding robot. The welding control device includes a sensing unit configured to detect a position of the workpiece, a root gap calculating unit configured to determine a root gap, and a storage unit including wire melting information as a database of a proper welding current corresponding to a feeding rate for each of the welding wire. A lamination pattern and a welding condition are provided in accordance with the root gap determined by the root gap calculating unit (Continued)

and the wire melting information so that an amount of heat input is equal to or less than a predetermined amount of heat input.

18 Claims, 29 Drawing Sheets

(51) Int. Cl.
    *B23K 9/127*     (2006.01)
    *B23K 35/02*     (2006.01)
    *B23K 35/30*     (2006.01)
    *B23K 37/047*     (2006.01)
    *B23K 9/12*     (2006.01)
    *B23K 101/24*     (2006.01)

(52) U.S. Cl.
    CPC ............... *B23K 9/12* (2013.01); *B23K 9/127* (2013.01); *B23K 35/0266* (2013.01); *B23K 35/30* (2013.01); *B23K 37/047* (2013.01); *B23K 2101/24* (2018.08)

(56) References Cited

U.S. PATENT DOCUMENTS

| | | | | |
|---|---|---|---|---|
| 2012/0279949 A1* | 11/2012 | Simmons | ........... | B23K 37/0533 219/159 |
| 2014/0215787 A1* | 8/2014 | Wada | ........... | B02C 18/18 29/402.18 |
| 2015/0328724 A1* | 11/2015 | Wallero | ........... | C22C 38/42 428/683 |
| 2016/0016267 A1* | 1/2016 | Beatty | ........... | B23K 37/0452 29/559 |
| 2017/0209950 A1* | 7/2017 | Nishimura | ........... | B23K 9/173 |
| 2017/0232546 A1* | 8/2017 | Marakkala Manage | ........... | B23K 9/26 219/86.8 |
| 2018/0043455 A1* | 2/2018 | Vigdal | ........... | B23K 15/0086 |
| 2019/0022800 A1* | 1/2019 | Galvagnini | ........... | B23K 26/083 |
| 2019/0232417 A1* | 8/2019 | Miyata | ........... | B23K 35/30 |

FOREIGN PATENT DOCUMENTS

| | | |
|---|---|---|
| JP | 6-31444 | 2/1994 |
| JP | 7-328769 A | 12/1995 |
| JP | 2002-1533 A | 1/2002 |
| JP | 2007-222909 A | 9/2007 |
| JP | 2013-202673 A | * 10/2013 |
| JP | 2013-202673 A | 10/2013 |
| WO | 2015/186795 A1 | 12/2015 |

OTHER PUBLICATIONS

International Search Report dated Sep. 5, 2017 in PCT/JP2017/025931 filed on Jul. 18, 2017.

Extended European Search Report dated Apr. 8, 2020 in European Patent Application No. 17834098.0, 6 pages.

\* cited by examiner

If current conduction cannot be detected, proceeding to retry process

Detecting current conduction by the reduction of sensing voltage

Reverse inching until the sensing voltage rises

Further reverse inching by predetermined length to improve arc starting property If current conduction cannot be detected, further reverse inching of wire by predetermined length After reverse inching, lifting up a torch at a predetermined position set with reference to the arc start position in the XYZ directions Moving to the position shifted in the XYZ directions with reference to the arc start position Applying the sensing voltage again and executing current conduction detection process If current conduction cannot be detected, reverse inching the wire by predetermined length again

WELDING DEVICE

TECHNICAL FIELD

The present invention relates to a welding device in which a large-size workpiece is automatically welded by a welding robot using a welding wire.

BACKGROUND ART

In the background art, a method in which a plurality of joints are automatically welded by a welding robot is generally used for a large-size workpiece, such as a steel structure. Multilayer welding is typically performed on each joint. In the multilayer welding, a welding wire is welded continuously over a plurality of layers in the joint. When welding the joint is terminated, a next joint is welded in the same manner. Such steps are repeated to weld the joints.

According to Patent Literature 1, in order to optimize welding work for automatically welding a large-size workpiece, an operation orbit of a welding robot and a welding condition are automatically generated based on information such as dimensions of the steel structure and so on inputted into an input unit of a welding control device. Accordingly, the welding work can be automated without individually generating teaching data such as the operation orbit or the welding condition. Thus, it is possible to optimize the welding work.

CITATION LIST

Patent Literature

Patent Literature 1: JP-A-2013-202673

SUMMARY OF THE INVENTION

Problem that the Invention is to Solve

However, the multilayer welding requires strict management of heat input in order to prevent deterioration in mechanical performance of deposited metal, deformation caused by thermal strain, etc. For example, for welding of a steel structure, heat input is regulated to a limit of 40 kJ/cm or 30 kJ/cm (Technical Recommendations for Steel Construction for Buildings—Part1 Guide to Steel-rib Fabrications: Architectural Institute of Japan). A welding device disclosed in Patent Literature 1 does not use any means for managing heat input. For example, in a case where root gap fluctuation occurs, there is a possibility that heat input exceeds the heat input limit when a welding condition is automatically provided. In addition, as for control, characteristics of a welding wire are not taken into consideration. The characteristics of the welding wire is one of factors about the heat input. For example, when materials having different electric resistances are used, different welding currents are outputted in spite of the same rate with which the materials are fed. The characteristics of the welding wire have great influence on the amount of heat input. On the other hand, when the welding current is fixed to adjust the heat input, the feeding rate changes to give influence to the amount of deposition. When welding is not performed with a proper amount of deposition, welding defects such as undercut, overlap, lack of penetration, etc., defective bead appearance, or spatters are generated. Thus, the characteristics of the welding wire also have influence on the quality after welding. Deterioration of mechanical performance, deformation caused by thermal strain or bad welding quality, caused by heat input exceeding its limit, lead to necessity of welding resumption, repair work, or the like. Thus, the efficiency of the welding work is significantly reduced.

The present invention has been developed in consideration of the aforementioned problems. An object of the invention is to provide a welding device in which automatic welding using a welding wire is performed by an automatic welding control method using characteristic information of the welding wire to thereby automate management of heat input and secure quality after the welding, so that total efficiency of welding work can be improved.

Means for Solving the Problem

The aforementioned object of the invention is attained by the following configurations.

(1) A welding device for automatically welding a workpiece by a welding robot using a welding wire, including a welding control device that controls operation and welding work of the welding robot, the welding control device including:

a sensing unit configured to detect a position of the workpiece;

a root gap calculating unit configured to determine a root gap based on data of detected positions of both groove faces in a groove width direction from a detection position of a predetermined depth relative to a set groove depth from at least one surface of the workpiece, the data of detected positions of the both groove faces being detected by the sensing unit, a difference between the set groove depth and a detection start position, and preset angles of both of the groove faces; and a storage unit including wire melting information as a database of a proper welding current corresponding to a feeding rate for each of the welding wire, wherein a lamination pattern and a welding condition are provided in accordance with the root gap determined by the root gap calculating unit and the wire melting information so that an amount of heat input is equal to or less than a predetermined amount of heat input.

According to the welding device configured thus, even if the root gap has fluctuation, the welding condition can be controlled to limit the amount of heat input to the predetermined one in accordance with the wire melting information, and a proper welding quality can be maintained.

(2) A welding device according to the configuration (1), wherein the wire melting information is set within a range of "12≤{proper welding current (A)/feeding rate (m/min)}≤125" for each of the welding wire.

(3) A welding device according to the configuration (1), wherein the wire melting information includes information about a diameter of the welding wire, information about a wire extension, and gas information about a shielding gas, and the wire melting information includes a database of a proper welding current corresponding to a feeding rate for each of the welding wire within a range of 1.0 to 2.0 mm in the diameter and a range of 10 to 35 mm in the wire extension.

(4) A welding device according to any one of the configurations (1) through (3), wherein the wire melting information includes information of a composition of the welding wire, the welding wire containing, based on total weight of the welding wire, C: 0.50 mass % or less (including 0%)

Si: 0.10 to 2.00 mass %

Mn: 0.10 to 3.00 mass %

S: 0.0001 to 0.0500 mass %
Ti: 0.80 mass % or less (including 0%)
Al: 0.80 mass % or less (including 0%)
Mo: 5.0 mass % or less (including 0%)
Cr: 30.0 mass % or less (including 0%)
Ni: 20.0 mass % or less (including 0%)
Cu: 1.0 mass % or less (including 0%)
B: 0.0100 mass % or less (including 0%).

The welding device having at least one of the configurations (2) to (4) can automate management of heat input at higher accuracy, and the welding quality can be further enhanced for the regulated amount of heat input.

(5) A welding device according to the configuration (4),
wherein a ratio between Si, Al and Ti which are contained in the welding wire satisfies the following relationship of "$0.10 \leq Si/\{1+(Al+Ti)\}$".

The welding device configured thus can make it easy to remove slag during multilayer welding to thereby further enhance the welding quality.

(6) A welding device according to the configuration (1),
wherein the sensing unit detects the position of the workpiece with a laser sensor, or detects the position of the workpiece by applying a sensing voltage between a welding torch supporting the welding wire set to have the predetermined extension and the workpiece, and detecting a current conduction state caused by contact between the welding wire and the workpiece.

According to the welding device configured thus, the position of the workpiece can be detected by the sensing unit, and the root gap can be calculated by the root gap calculating unit based on the position of the workpiece.

(7) A welding device according to the configuration (1),
further including:
a pair of rotary positioners that is provided movably in a longitudinal direction of the workpiece and holds and rotates the workpiece;
a carriage or a plurality of carriages, provided movably in a parallel direction to the direction in which the pair of the rotary positioners move;
the welding robot, provided on the carriage movably in a perpendicular direction to the direction in which the rotary positioners move; and
a welding torch, provided at an end of the welding robot,
wherein:
the pair of rotary positioners includes:
a pair of annular holding members that receive the workpiece internally and hold the workpiece with a plurality of fixing jigs; and
a driving member that rotates one or both of the pair of annular holding members; and
wherein each of the annular holding members is divided at a predetermined position of an annular portion to form a part of the annular portion to be open, so that the workpiece can be received in the annular holding members.

According to the welding device configured thus, the workpiece is held by the pair of rotary positioners. In addition, for example, when a straight part of the workpiece is welded by the welding robot, it is possible to weld the straight part by the welding robot without rotating the workpiece. On the other hand, when an arc part (i.e., corner portion) of the workpiece is welded by the welding robot, it is possible to weld the arc part while rotating the workpiece. Accordingly, the welding device can weld not only the straight part of the workpiece but also the arc part of the workpiece continuously without disconnecting an arc for welding.

(8) A welding device according to the configuration (7),
wherein when a plurality of welding joints having different volumes to be welded due to different sectional areas of the workpiece or different welding lengths of the workpiece or both of them are welded concurrently by the welding robots, a feeding amount of the welding wire is controlled to be changed to compensate the difference in the volume to be welded in order to equalize a welding time from a base point to a next base point.

According to the welding device configured thus, the feeding amount of the welding wire is changed from one of the welding robots to another so that the welding joints having different volumes to be welded can be welded concurrently by the welding robots.

(9) A welding device according to the configuration (8),
wherein the welding control device sets a range of a welding current with which welding can be performed in each of passes, performs welding within the range in the pass, and makes control to compensate a difference in amount of deposition generated as a result of the welding in another following pass, so that a total amount of deposition is within a desired range.

According to the welding device configured thus, a difference in thickness occurring during welding in one pass can be compensated in another subsequent pass, so that total thickness can be put within a desired value. Thus, the welding joints can be welded concurrently efficiently and properly by the welding robots.

(10) A welding device according to the configuration (8),
wherein when welding cannot be performed within a range of a welding current with which welding can be performed in each of passes, the welding control device makes control to weld the welding joints individually in at least one of the passes so that a total error in thickness is compensated.

According to the welding device configured thus, the welding joints are welded individually in at least one of the passes so as to compensate the total error in thickness. Thus, in spite of a large difference in volume to be welded from one base point to another in each of the welding joints, the one or plural welding joints can be welded concurrently efficiently and properly by the one or plural welding robots.

(11) A welding device according to the configuration (9) or (10),
wherein when welding cannot be performed within a range of a welding current with which welding can be performed in each of passes, the welding control device makes control to increase a difference in wire feeding amount and to change an extension of the welding wire so that a welding current being out of the proper range is set at a desired value.

According to the welding device configured thus, the extension of the welding wire is changed among the welding robots so that the one or plural welding joints can be welded concurrently efficiently by the one or plural welding robots while keeping a proper current.

(12) A welding device according to the configuration (1),
further including a slag removing device provided at an end of the welding robot, the slag removing device removing a slag generated in a weld portion of the workpiece.

According to the welding device configured thus, a slag generated in the weld portion can be removed. Thus, welding failure or welding defects can be prevented.

(13) A welding device according to the configuration (1),
further including a nozzle exchanging device that exchanges a nozzle provided at an end of a welding torch, the nozzle exchanging device including:

a coil spring to which the nozzle can be inserted; and a rotary drive source that rotationally drives the coil spring, to which the nozzle is inserted, around a central axis of the coil spring, so as to remove the nozzle from a torch body of the welding torch.

According to the welding device configured thus, even if the nozzle is inserted into the coil spring so as to be misaligned therefrom, the coil spring can follow the nozzle easily due to deformation and flexibility of the coil spring. Thus, the nozzle can be exchanged surely in spite of thermal deformation or a dimensional error of the nozzle.

(14) A welding device according to the configuration (1), wherein when multilayer welding is performed on a plurality of weld portions in the workpiece, welding of each layer is dividedly performed in each of the weld portions in a predetermined order.

According to the welding device configured thus, interpass temperature can be controlled in addition to the management of heat input.

(15) A welding device according to the configuration (1), wherein the welding control device includes at least an input unit to which at least one or both of dimensions of the workpiece and a shape of a welding joint, and information about whether welding can be executed or not are inputted through input by a worker or through input of CAD data of the workpiece, and the welding control device automatically provides a welding robot operation orbit and a welding condition for welding, based on a welding robot orbit and a welding condition prepared in advance in accordance with at least one or both of the dimensions of the workpiece and a shape of the welding joint, and performs welding.

According to the welding device configured thus, an operation orbit of the welding robot and a welding condition can be automatically generated based on information about the dimensions of the workpiece and so on inputted into the input unit of the control device.

Advantage of the Invention

According to a welding device according to the invention, management of heat input is automated and quality after welding is secured based on characteristic information of a welding wire, so that total efficiency of welding work can be improved.

MODE FOR CARRYING OUT THE INVENTION

Figure 1:
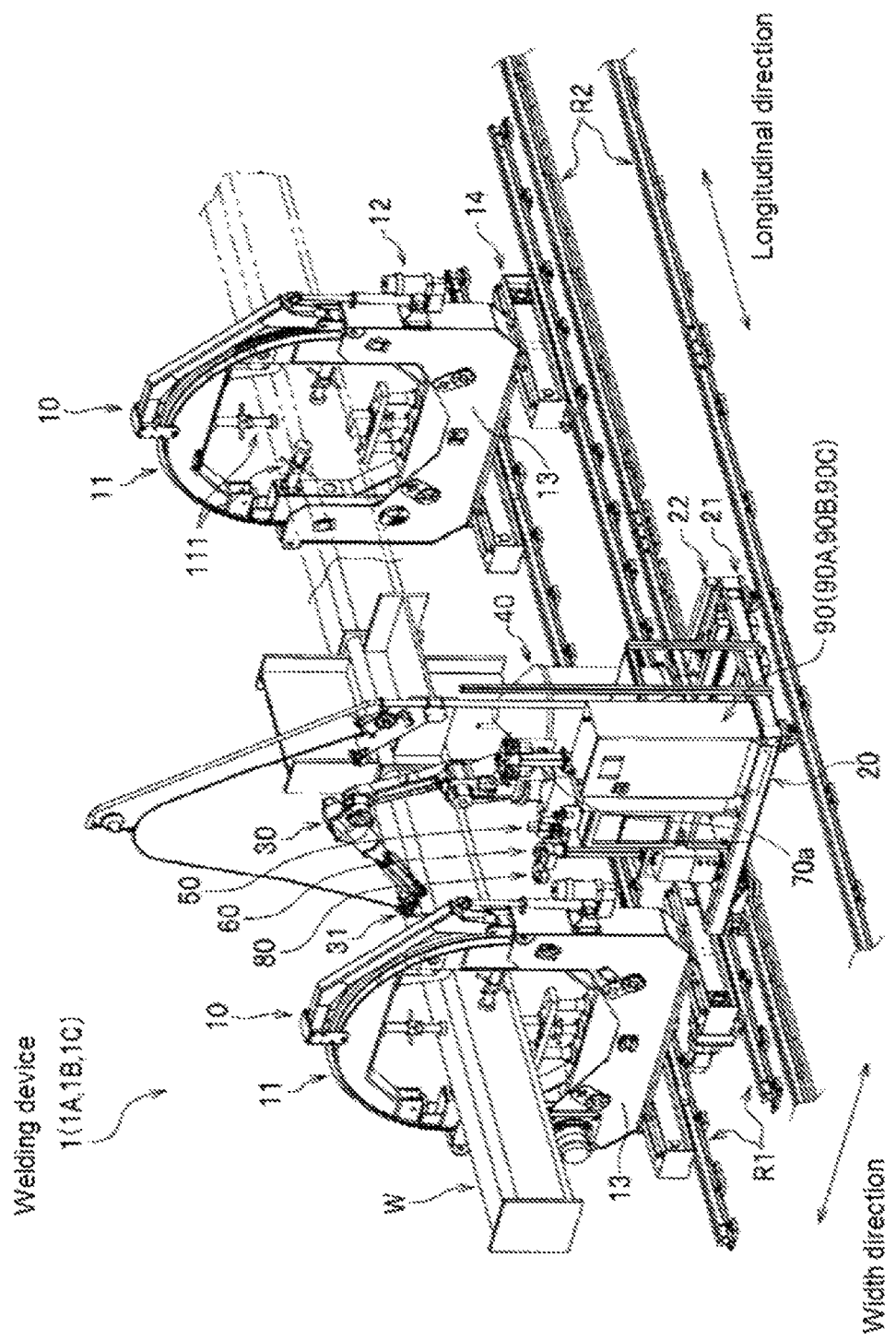
FIG. 1 is a schematic view showing an overall configuration of a welding device according to an embodiment of the invention.

Each embodiment of a welding device according to the invention will be described below in detail with reference to the drawings. For convenience of explanation, sizes or shapes of members in the drawings may be exaggerated, or depiction of a partial configuration may be omitted.

First Embodiment

A welding device according to this embodiment of the invention will be described with reference to FIG. 1 to FIG. 14. The welding device 1 welds a steel structure W, which is a workpiece, for example, by gas shielded arc welding. As shown in FIG. 1, the welding device 1 has rotary positioners 10, a carriage 20, a welding robot 30, a wire supply vessel 40, a nozzle exchanging device 50, a nozzle cleaning device 60, a wire cutting device 80, and a welding control device 90. In addition, the welding device 1 has a slag removing device 70 (see FIG. 6) in addition to the configuration shown in FIG. 1.

(Rotary Positioner)

During welding, the rotary positioners 10 hold the workpiece W and rotate the workpiece W. The rotary positioners 10 are configured to be paired as shown in FIG. 1, so as to hold the columnar workpiece W at two points in a longitudinal direction of the workpiece W. The rotary positioners 10 do not rotate the workpiece W when a straight part of the workpiece W is, for example, welded by the welding robot 30, but rotate the workpiece W when an arc part (i.e., corner portion) of the workpiece W is welded by the welding robot 30. In this manner, the welding device 1 can weld not only the straight part of the workpiece W but also the arc part of the workpiece W continuously without disconnecting an arc for welding. Each of the rotary positioners 10 here has an annular holding member 11, a lifting arm 12, a bracket 13, and rail carriages 14.

Figure 2A:
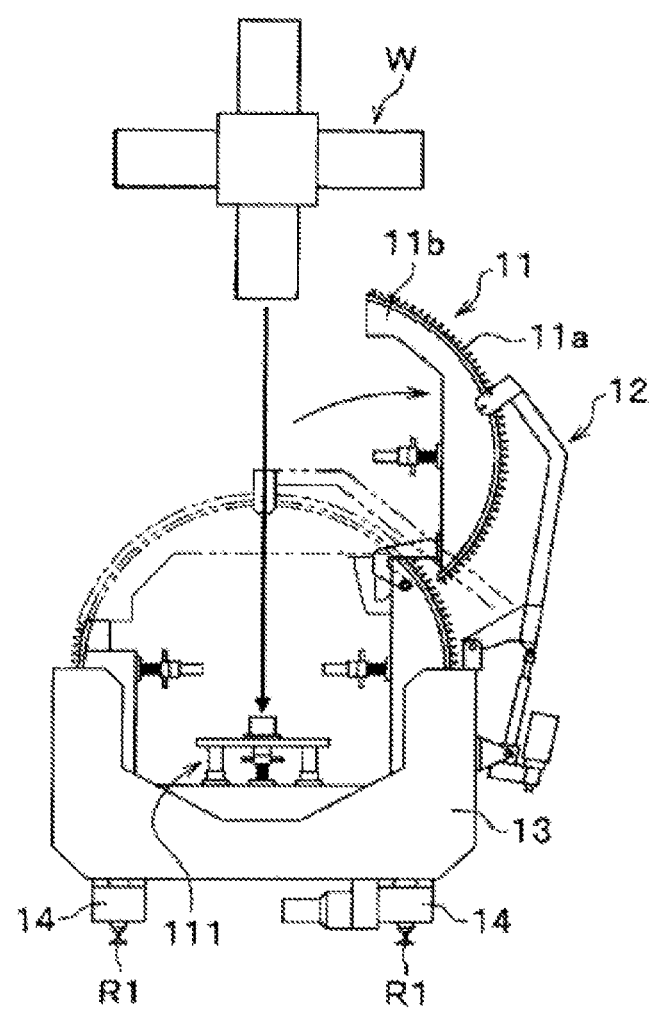
FIG. 2A is a schematic view illustrating a configuration and operation of a rotary positioner provided in the welding device according to the embodiment of the invention, the view showing a state in which an arc part of an annular holding member has been opened.

The annular holding member 11 receives and holds the workpiece W internally. Inside the annular holding member 11, a plurality of fixing jigs 111 for holding the workpiece W on four sides are stretchably/contractibly provided as shown in FIG. 1. The annular holding member 11 fixes the workpiece W by the fixing jigs 111 holding the workpiece W on the four sides as shown in FIG. 1. In addition, a gear 11a is formed in the outer circumference of the annular holding member 11 as shown in FIG. 2A. As will be described later, the gear 11a is arranged to engage with a pinion gear 131 provided inside the bracket 13 (see FIG. 3A and FIG. 3B). The gear 11a excluding a part (only the right side of the circumference) is not shown in FIG. 1.

The lifting arm mechanism 12 divides the annular holding member 11 so as to open/close the annular holding member 11. The lifting arm mechanism 12 is provided at a side (right side here) of the annular holding member 11 and the bracket 13 as shown in FIG. 2A. One end side of the lifting arm mechanism 12 is connected to an upper portion of the annular holding member 11, and the other end side is connected to a side face (right side here) of the bracket 13.

Figure 2B:
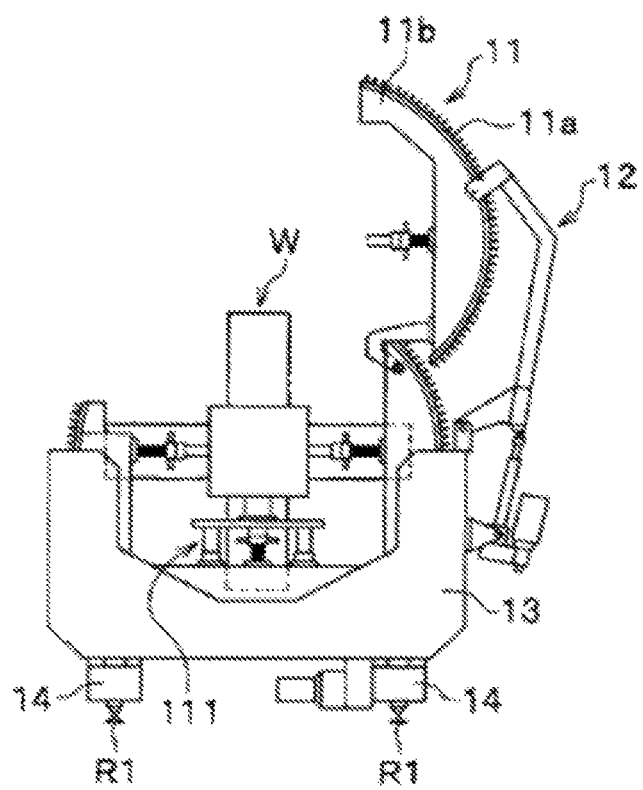
FIG. 2B is a schematic view illustrating the configuration and the operation of the rotary positioner provided in the welding device according to the embodiment of the invention, the view showing a state in which a steel structure has been received.
Figure 2C:
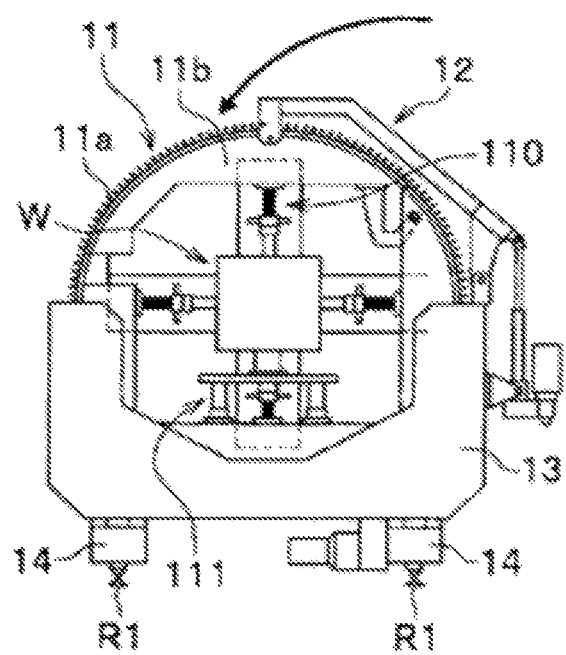
FIG. 2C is a schematic view illustrating the configuration and the operation of the rotary positioner provided in the welding device according to the embodiment of the invention, the view showing a state in which the arc part of the annular holding member has been closed.

Specifically as shown in FIG. 2A, the lifting arm mechanism 12 opens the annular holding member 11 so as to divide the annular holding member 11 at a predetermined position, and to separate a part of the annular holding member 11, that is, an arc part 11b from the other part of the annular holding member 11 so that the workpiece W can be received in the annular holding member 11. When the workpiece W is received as shown in FIG. 2B, the lifting arm mechanism 12 closes the arc part 11b again as shown in FIG. 2C. Thus, the workpiece W is held by the four fixing jigs 111 provided inside the annular holding member 11.

Figure 3A:
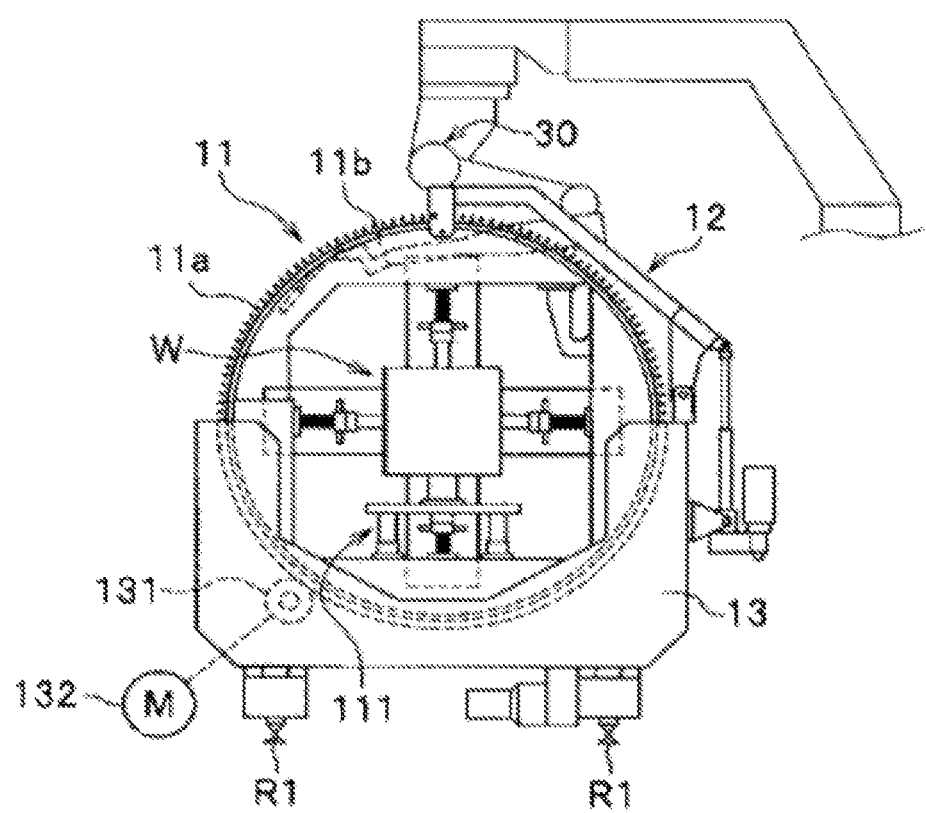
FIG. 3A is a schematic view illustrating the configuration and the operation of the rotary positioner provided in the welding device according to the embodiment of the invention, the view showing a state in which the annular holding member has been stopped.

The bracket 13 receives the annular holding member 11 as shown in FIG. 1. The bracket 13 has a shape which receives the lower half of the annular holding member 11 therein and exposes the upper half of the annular holding member 11 therefrom, as shown in FIG. 2A. In addition, the pinion gear 131 and a driving member 132 are provided inside the bracket 13 as shown in FIG. 3A. The pinion gear 131 is disposed to engage with the gear 11a of the annular holding member 11. The driving member 132 drives the pinion gear 131. The driving member 132 may be provided in at least one of the pair of rotary positioners 10. The rotary positioners 10 may have a configuration in which one rotary positioner 10 follows rotation of the other rotary positioner 10.

The rail carriages 14 can move the rotary positioner 10 along positioner moving rails R1. The rail carriages 14 are provided to be paired under the rotary positioner 10 as shown in FIG. 1, so that the rotary positioners 10 can be moved in the longitudinal direction of the workpiece W.

Figure 3B:
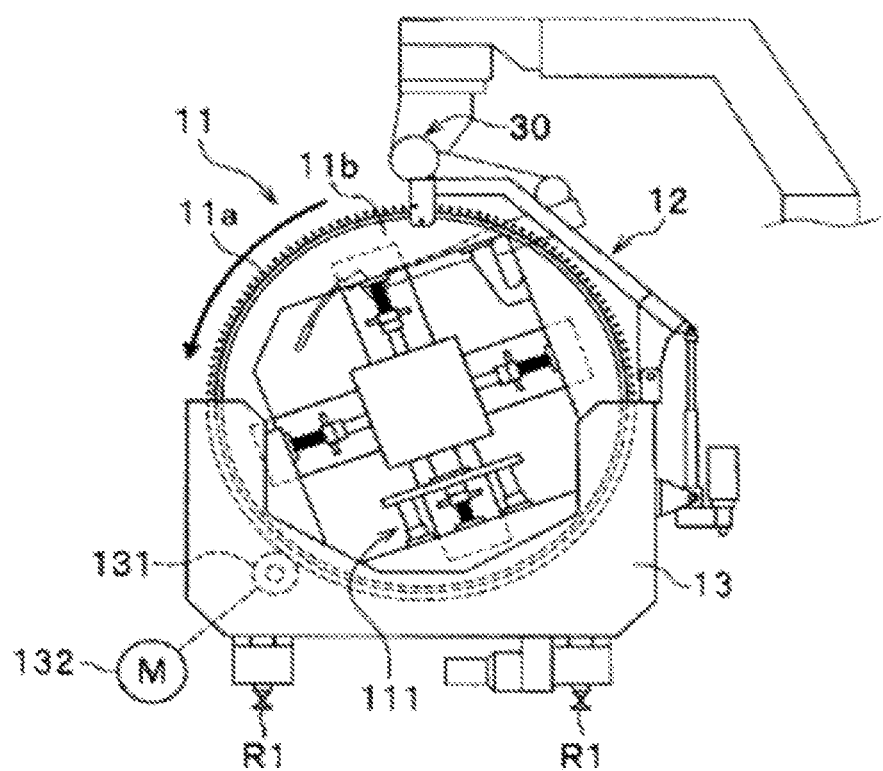
FIG. 3B is a schematic view illustrating the configuration and the operation of the rotary positioner provided in the welding device according to the embodiment of the invention, the view showing a state in which the annular holding member has been rotated.

The rotary positioner 10 has a configuration in which the gear 11a formed in the outer circumference of the annular holding member 11 and the pinion gear 131 provided inside the bracket 13 engage with each other as described previously (see FIG. 3A). Accordingly, when the annular holding member 11 is driven and rotated by the driving member 132 as shown in FIG. 3B, the rotary positioner 10 can rotate the workpiece W during welding work.

(Carriage)

The respective mechanisms constituting the welding device 1 are mounted on the carriage 20. The carriage 20 is formed into a flat plate-like shape as shown in FIG. 1. The welding robot 30, the wire supply vessel 40, the nozzle exchanging device 50, the nozzle cleaning device 60, the wire cutting device 80 and the welding control device 90 are mounted on the top of the carriage 20. In addition, a slag removing device mounting table 70a on which the slag removing device 70 is mounted (see FIG. 6) is also mounted on the carriage 20.

Wheels 21 are provided in a lower portion of the carriage 20. The carriage 20 is configured so that the carriage 20 can move along carriage moving rails R2 with the wheels 21. That is, the carriage 20 is provided moveably in the longitudinal direction of the workpiece W, corresponding to a direction parallel with the aforementioned moving direction of the rotary positioners 10.

A slider mechanism 22 is provided on the top of the carriage 20. The welding robot 30 is mounted on the top of the slider mechanism 22. The slider mechanism 22 is configured movably in a direction perpendicular to the moving direction of the rotary positioners 10, that is, the longitudinal direction of the workpiece W. Accordingly, the welding robot 30 mounted on the top of the slider mechanism 22 is configured movably in a direction perpendicular to the moving direction of the rotary positioners 10 during welding.

(Welding Robot)

The welding robot 30 welds the workpiece W. The welding robot 30 has a welding torch 31, which feeds a welding wire to an end of an arm, as shown in FIG. 1. The welding torch 31 is connected to a not-shown welding power supply so that electric power can be supplied to the welding wire through the welding torch 31. The welding robot 30 is mounted on the carriage 20 through the slider mechanism 22 so that the welding robot 30 can move in a direction perpendicular to the moving direction of the rotary positioners 10 (i.e., a width direction of the workpiece W), as described previously. In addition, the welding robot 30 is disposed between the pair of rotary positioners 10 or outside between the rotary positioners 10 so that the welding robot 30 can weld a welding joint between the pair of rotary positioners 10.

(Wire Supply Vessel)

The wire supply vessel 40 receives a welding wire to be supplied to the welding torch 31. The wire supply vessel 40 is formed into a cylindrical shape as shown in FIG. 1. The welding wire is received to be wound like a coil inside the wire supply vessel 40. The welding wire inside the wire supply vessel 40 is unwound for welding by a not-shown wire feeding device, passed through a wire extracting jig tapered and narrowed in an upper portion of the vessel, and supplied to the welding torch 31 through a not-shown conduit tube.

(Nozzle Exchanging Device)

The nozzle exchanging device 50 exchanges a nozzle for supplying a shielding gas. The nozzle is provided at the end of the welding torch 31. For example, when a welding joint with a deep groove is welded by the welding device 1, there is a case in which a short nozzle is used for welding a first layer or a second layer of the welding joint in order to prevent interference between the nozzle and the groove, and a long nozzle is used for welding subsequent layers in order to secure shieldability. In such a case, the nozzle exchanging device 50 is used so that the nozzle can be exchanged even on the way of welding. Thus, the exchanging work can be automated.

Figure 4:
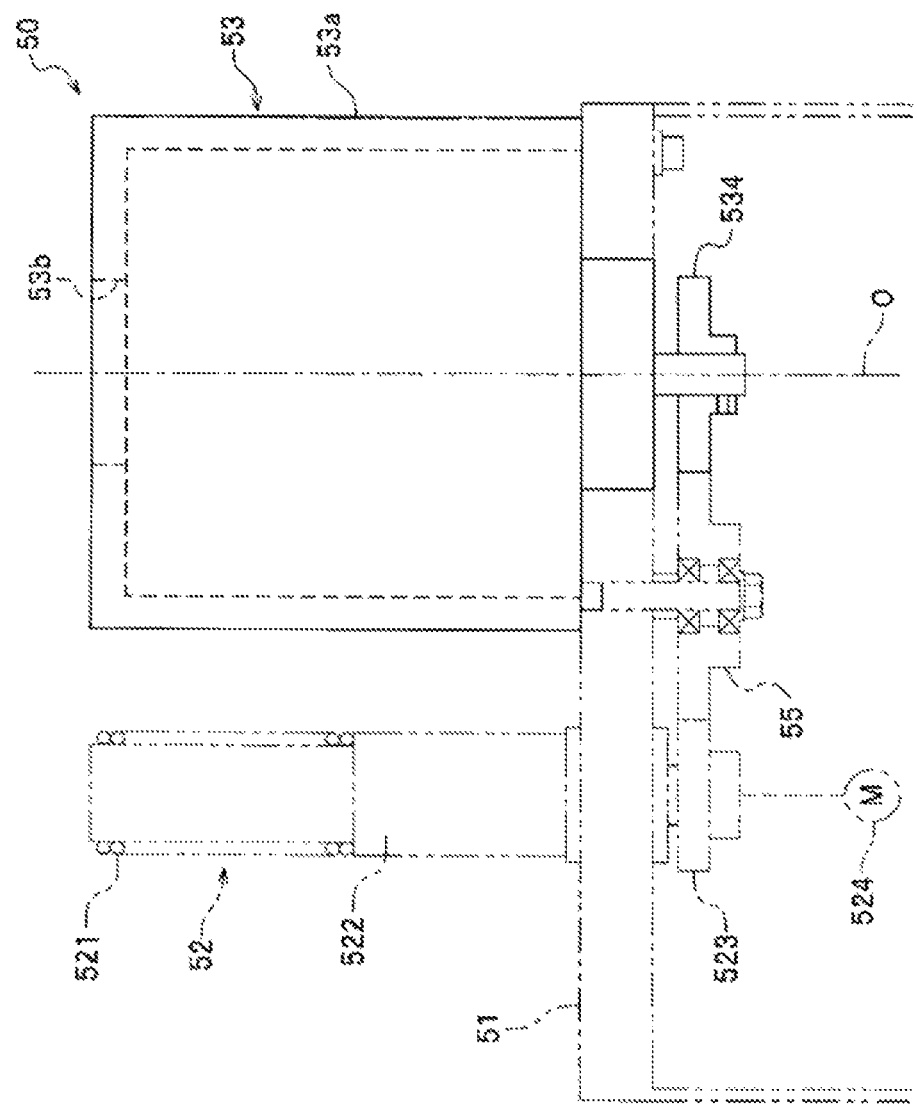
FIG. 4 is a sectional view showing a configuration of a nozzle exchanging device provided in the welding device according to the embodiment of the invention.

The nozzle exchanging device 50 is mounted near the welding robot 30 on the carriage 20 as shown in FIG. 1. Specifically as shown in FIG. 4, the nozzle exchanging device 50 has a cylindrical base 51, a cylindrical nozzle attaching/detaching mechanism 52 mounted on the base 51, a cylindrical chip cleaning mechanism 53 mounted on the base 51, and an intermediate gear 55 connecting the nozzle attaching/detaching mechanism 52 and the chip cleaning mechanism 53 with each other. Although not shown here, a plurality of such nozzle attaching/detaching mechanisms 52 are disposed on the base 51.

The nozzle attaching/detaching mechanism 52 attaches/detaches the nozzle at the end of the welding torch 31. As shown in FIG. 4, the nozzle attaching/detaching mechanism 52 has a coil spring 521 to which the nozzle can be inserted, a cylindrical member 522 which supports the coil spring, and a rotary drive source 524 which rotates the coil spring 521 positively or reversely through a spur gear 523. The spur gear 523 is connected to a spur gear 534 through the intermediate gear 55 as shown in FIG. 4. Accordingly, the nozzle exchanging device 50 is arranged so that when the spur gear 523 on the nozzle attaching/detaching mechanism 52 side is rotated, the torque thereof is also transmitted to the spur gear 534 on the chip cleaning mechanism 53 side through the intermediate gear 55, as shown in FIG. 4.

Figure 5A:
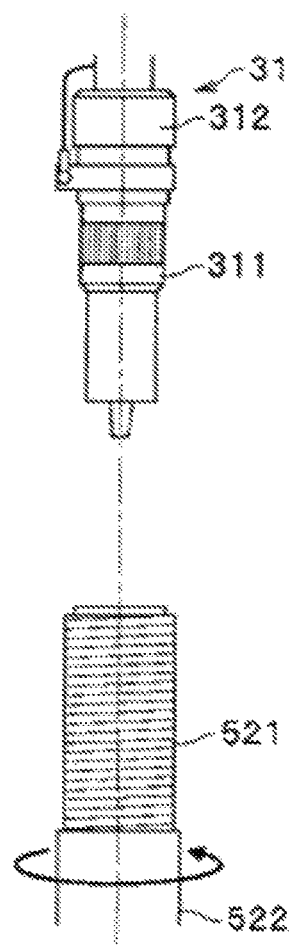
FIG. 5A is a view showing operation of a nozzle attaching/detaching mechanism of the nozzle exchanging device provided in the welding device according to the embodiment of the invention, the view showing a state in which a nozzle at an end of a welding torch has not been inserted into a coil spring of the nozzle attaching/detaching mechanism yet.
Figure 5B:
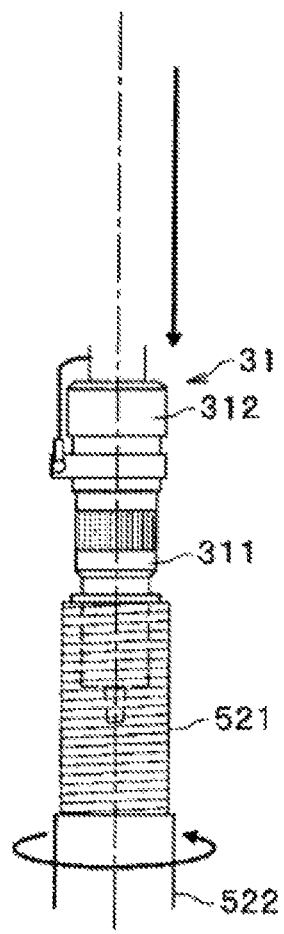
FIG. 5B is a view showing the operation of the nozzle attaching/detaching mechanism of the nozzle exchanging device provided in the welding device according to the embodiment of the invention, the view showing a state in which the nozzle at the end of the welding torch has been inserted into the coil spring of the nozzle attaching/detaching mechanism.
Figure 5C:
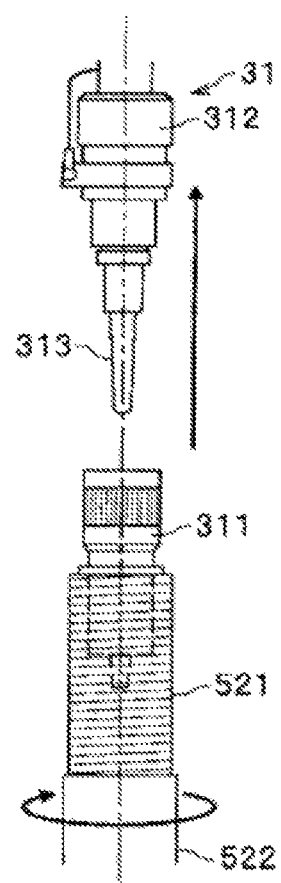
FIG. 5C is a view showing the operation of the nozzle attaching/detaching mechanism of the nozzle exchanging device provided in the welding device according to the embodiment of the invention, the view showing a state in which the nozzle at the end of the welding torch has been removed by the coil spring of the nozzle attaching/detaching mechanism.

The nozzle attaching/detaching mechanism 52 configured thus removes the nozzle from the welding torch 31, for example, in the following procedure. First, as shown in FIG. 5A, the nozzle attaching/detaching mechanism 52 uses the rotary drive source 524 to rotate the coil spring 521 in a direction in which the inner diameter of the spring becomes wider (counterclockwise here). Next, when the welding torch 31 descends to insert a nozzle 311 into the coil spring 521 as shown in FIG. 5B, the nozzle attaching/detaching mechanism 52 uses the rotary drive source 524 to rotate the coil spring 521 in a direction in which the inner diameter of the spring becomes narrower (clockwise here), as shown in FIG. 5C. As a result of this operation, the inner diameter of the coil spring 521 becomes so narrow that the nozzle 311 is fastened by the coil spring 521. Thus, when the welding torch 31 is lifted up, the nozzle attaching/detaching mechanism 52 can remove the nozzle 311 from a torch body 312 easily as shown in FIG. 5C. After the nozzle 311 is removed thus, a new nozzle 311 can be attached to the torch body 312 when the procedure shown in FIG. 5A to FIG. 5C is performed in reverse order.

The chip cleaning mechanism 53 cleans a chip 313 (see FIG. 5A to FIG. 5C) at the end of the welding torch 31 from which the nozzle 311 has been removed. That is, the nozzle exchanging device 50 is designed to clean the chip 313 at the end of the welding torch 31 after removing the nozzle 311 from the welding torch 31 by use of the nozzle attaching/detaching mechanism 52.

In the chip cleaning mechanism 53, as shown in FIG. 4, a through hole 53b to which the chip 313 (see FIG. 5C) at the end of the welding torch 31 can be inserted is formed on the upper portion of a cylindrical device body 53a. In addition, a plurality of brushes are disposed inside the device body 53a. The brushes are attached so that their rotation radius can increase if tension is applied toward their rotation center O to add a load thereto. To clean the chip, the nozzle 311 is removed, and the welding torch 31 equipped with the chip 313 and an orifice is lifted down and inserted into the through hole 53b from above the rotation center O, so as to remove spatters adhering to the chip 313 and the orifice.

Even when the nozzle 311 is inserted into the coil spring 521 so as to be deviated therefrom, the welding device 1 provided with the nozzle exchanging device 50 as described above can easily follow the deviation due to the deformation and flexibility of the coil spring 521. Thus, the nozzle 311 can be exchanged surely in spite of thermal deformation or a dimensional error in the nozzle 311.

(Nozzle Cleaning Device)

The nozzle cleaning device 60 cleans the nozzle 311 at the end of the welding torch 31. A through hole (not shown) to which the nozzle 311 of the welding torch 31 can be inserted is formed in an upper portion of the nozzle cleaning device 60 as shown in FIG. 1. The nozzle cleaning device 60 sprays shot balls onto the nozzle 311 which has been inserted into the through hole. Thus, ring-like spatters adhering to an end of the nozzle 311 are removed. The welding device 1 provided with the nozzle cleaning device 60 configured thus can prevent shieldability from deteriorating due to increase of spatters adhering to the nozzle 311.

(Slag Removing Device)

The slag removing device 70 removes slag generated in a weld portion when the workpiece W is welded by the welding robot 30. The slag removing device 70 may be either one in which the slag removing device 70 is used to replace the welding torch 31 at the end of the welding robot 31 therewith or one in which the slag removing device 70 is additionally mounted on the welding torch 31. In the following description, the one in which the slag removing device 70 is used to replace the welding torch 31 therewith will be explained.

Figure 6:
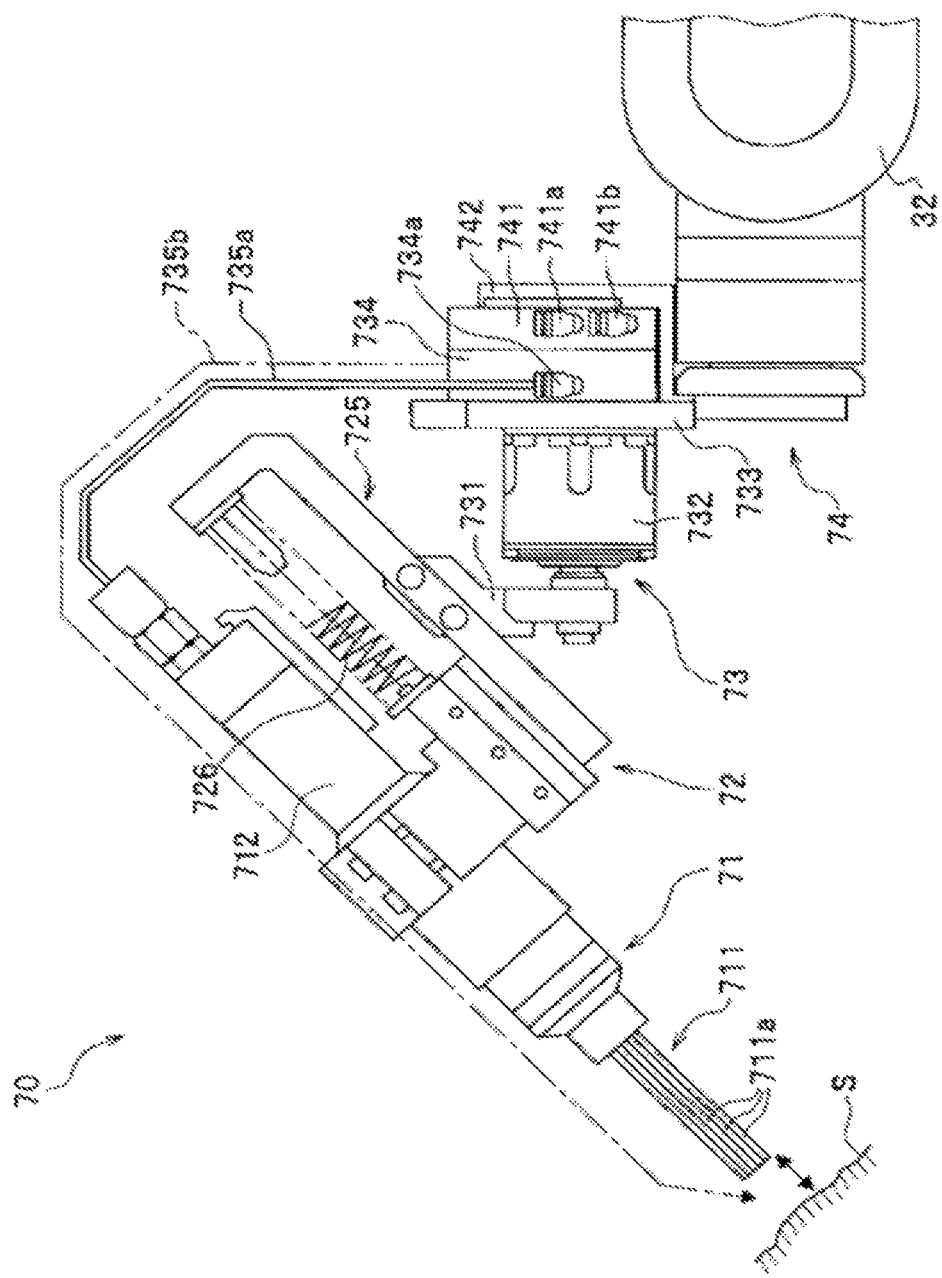
FIG. 6 is a side view showing a configuration of a slag removing device provided in the welding device according to the embodiment of the invention.

During welding, the slag removing device 70 is mounted on the slag removing device placing table 70a shown in FIG. 1 so that the welding torch 31 can be automatically replaced by the slag removing device 70 for each given pass prepared in advance during the welding. By the slag removing device 70 attached thus to the end of the welding robot 30, slag can be removed from the weld portion. Here as shown in FIG. 6, the slag removing device 70 has a chisel mechanism 71, a slide holding mechanism 72, a chisel-side attaching/detaching mechanism 73, and a robot-side attaching/detaching mechanism 74. In addition, the chisel mechanism 71, the slide holding mechanism 72, the chisel-side attaching/detaching mechanism 73, and the robot-side attaching/detaching mechanism 74 are removably attached to the slag removing device 70 as shown in FIG. 6.

The chisel mechanism 71 gives impact to the slag generated in the weld portion, to thereby remove the slag therefrom. As shown in FIG. 6, the chisel mechanism 71 holds a needle assembly 711 in which a plurality of needles 711a each having, for example, a diameter of 3 mm are bundled, and a needle driver 712 which supplies chisel operating air to move the needle assembly 711 forward/backward, for example, at a rate of 4,000 times per minute while holding the needle assembly 711 to protrude a front portion thereof.

As shown in FIG. 6, a spring 726 has an axial direction coinciding with a needle moving direction. The spring 726 flexibly supports the needle driver 712 in the needle moving direction. That is, the spring 726 supports the needle driver 712 flexibly in the needle moving direction at a neutral position where there occurs no compressive force or no tensile force when the needle driver 712 has been positioned in a horizontal state. When the axial direction of the spring 726 is made to coincide with the needle moving direction, the spring 726 can attenuate impulse force in the needle moving direction from the needle driver 712 efficiently to $\frac{1}{10}$ or less due to elastic force composed of compressive force and elastic force caused by expansion and contraction of the spring 726.

Here, the spring constant of the spring 726 is preferably within a range of, for example, from 0.20 to 0.35 (kg/mm) when the weight of its operating portion is 3.3 kg. The reason why the spring constant is set within the aforementioned range will be described. It is generally considered that the effect of attenuating vibration is higher as the spring 726 is made more flexible. However, the posture of the needle driver 712 changes in accordance with the position of a welding joint. When the spring 726 is too flexible, the weight applied to the spring 726 changes in accordance with a change in the posture of the needle driver 712, resulting in a large change in the position of the chisel end. In addition, in order to remove slag well, the needle driver 712 cannot give, to a bead and the slag, an impact force high enough to remove the slag unless the needle driver 712 is held by a holding force not lower than a predetermined one. The slide holding mechanism 72 may use a shock damper of another system in place of the spring 726 as long as it has an equivalent function to the spring 726.

The chisel-side attaching/detaching mechanism 73 can attach/detach the chisel mechanism 71 and the slide holding mechanism 72 to the robot-side attaching/detaching mechanism 74. As shown in FIG. 6, one end of the chisel-side attaching/detaching mechanism 73 is connected to a slide support member 725 of the slide holding mechanism 72 while the other end is connected to a robot-side attaching/detaching member 741 of the robot-side attaching/detaching mechanism 74. As shown in FIG. 6, the chisel-side attaching/detaching mechanism 73 has a connection member 731 that is connected to a lower surface of the slide support member 725, a shock sensor 732 that is connected to the connection member 731 so as to detect impact force transmitted from the slide holding mechanism 72, a tool plate 733 that supports the shock sensor 732, and a tool-side attaching/detaching member 734 that is fixedly provided on the tool plate 733.

An air port 734a is formed in a side circumferential face of the tool-side attaching/detaching member 734 as shown in FIG. 6. The air port 734a is connected to the aforementioned needle driver 712 through a flexible first air duct 735a so as to supply chisel operating air to the needle driver 712, as shown in FIG. 6. In addition, a second air duct 735b as shown in FIG. 6 is connected to a not-shown air port in the side circumferential face of the tool-side attaching/detaching member 734. As shown in FIG. 6, the second air duct 735b has a configuration in which an open end of the second air duct 735b is disposed near an end portion of the needle assembly 711 so that blowing air can be sprayed from the open end toward the front of the end of the needle assembly 711 to thereby blow out slag from the surface of the weld portion.

In addition, the robot-side attaching/detaching member 741 is attachably/detachably connected to the tool-side attaching/detaching member 734 by attaching/detaching air as shown in FIG. 6. The tool-side attaching/detaching member 734 and the robot-side attaching/detaching member 741 are designed to be able to be electrically connected to each other to thereby transmit a shock detection signal from the aforementioned shock sensor 732, and to be able to form air paths through which the chisel operating air and the blowing air can be passed.

A first air port 741*a* and a second air port 741*b* are formed in the side circumferential face of the robot-side attaching/detaching member 741 as shown in FIG. 6, and a not-shown third air port is also formed therein. The first air port 741*a* communicates with the aforementioned air port 734*a* of the tool-side attaching/detaching member 734 through an air path. The first air port 741*a* is also connected to a not-shown chisel operating air supply device for supplying the chisel operating air when the slag is removed. On the other hand, the second air port 741*b* is connected to a not-shown attaching/detaching air supply device for supplying the attaching/detaching air when attaching/detaching operation is performed. Further, the third air port communicates with the second air duct 735*b* through an air path, and is also connected to a not-shown blowing air supply device for supplying the blowing air when the slag is removed. The aforementioned three kinds of air supply devices (not shown) may be constituted by on-off valves corresponding to three ports which are on-off controlled at predetermined timings, and a single air feeding device to which the on-off valves are connected.

Description has been made here, as shown in FIG. 6, about the slag removing device 70 having a configuration in which the shock sensor 732, the tool plate 733, the tool-side attaching/detaching member 734, the robot-side attaching/detaching member 741, and a bracket 742 are disposed in this order on the slide holding mechanism 72 so that the tool-side attaching/detaching member 734 and the robot-side attaching/detaching member 741 can be removably attached to each other. However, the layout of the respective constituents is not limited to that shown in FIG. 6. For example, the slag removing device 70 may have a configuration in which the tool-side attaching/detaching member 734, the robot-side attaching/detaching member 741, the tool plate 733, the shock sensor 732, and the bracket 742 are disposed in this order on the slide holding mechanism 72 through a bracket (not shown) or a base plate (not shown) similar to the tool plate 733 so that the tool-side attaching/detaching member 734 and the robot-side attaching/detaching member 741 can be removably attached to each other.

The slag removing device 70 configured thus is, for example, mounted on the slag removing device mounting table 70*a* shown in FIG. 1 when welding is performed using the welding torch 31. After a given pass prepared in advance has been terminated, the slag removing device 70 is attached to an arm portion end 32 of the welding robot 30 to remove the slag from the weld portion, as shown in FIG. 6. When the slag is being removed by the slag removing device 70, the welding torch 31 is mounted on the slag removing device mounting table 70*a* in place of the slag removing device 70.

Here, the welding pass where the slag is to be removed by the slag removing device 70 is inputted to the welding control device 90 as teaching data in advance. For example, assume that teaching data indicating that the slag is to be removed in the fifth pass has been inputted to the welding control device 90. In this case, when the welding control device 90 determines that a welding step in the fifth pass has been finished and the teaching data has an instruction to remove the slag, the welding control device 90 operates the welding robot 30 to move the welding torch 31 toward the aforementioned slag removing device mounting table 70*a*.

Next, the welding control device 90 mounts the welding torch 31 on the slag removing device mounting table 70*a*, releases the tool-side attaching/detaching member 734 and the robot-side attaching/detaching member 741 from connection with each other, and detaches the welding torch 31 from the arm portion end 32 of the welding robot 30. Next, the welding control device 90 mounts the slag removing device 70, which has been mounted on the slag removing device mounting table 70*a*, on the arm portion end 32 of the welding robot 30. When the welding torch 31 is replaced by the slag removing device 70 in this manner, the welding control device 90 subsequently makes up teaching data for removing slag, and removes the slag from the weld portion based on the teaching data for removing the slag.

In the case where the aforementioned slag removing device 70 is not used to replace the welding torch 31 but additionally mounted on the welding torch 31, for example, a tool attaching/detaching member for clamping a chisel may be provided near the welding torch 31, or a mounting unit for clamping the slag removing device 70 by means of an air expansion clamping mechanism or the like may be provided. After the given welding pass has been terminated, the slag removing device 70 may be arranged to be additionally mounted on the mounting unit of the welding torch 31 so as to remove the slag.

The welding device 1 having the slag removing device 70 as described above can remove the slag generated in the weld portion. Thus, welding failure or welding defects can be prevented.

(Wire Cutting Device)

The wire cutting device 80 cuts off the welding wire. The welding robot 30 performs sensing (in three directions, such as gap sensing) using the welding wire in order to detect a welding position or a position of the workpiece W, as will be described later. However, when slag adheres to the end of the welding wire, electric conductivity for sensing may deteriorate so that the position cannot be accurately detected. Therefore, the welding device 1 uses the wire cutting device 80 to cut the end of the welding wire to thereby remove the slag therefrom and increase the sensing accuracy.

The wire cutting device 80 is disposed on the carriage 20 and at a height the welding torch 31 can reach easily, as shown in FIG. 1. The wire cutting device 80, for example, has a plurality of cutters for cutting the welding wire. Edges of the cutters are, for example, driven by air so that the welding wire can be cut by crossing the edges with each other.

(Welding Control Device)

Figure 7:
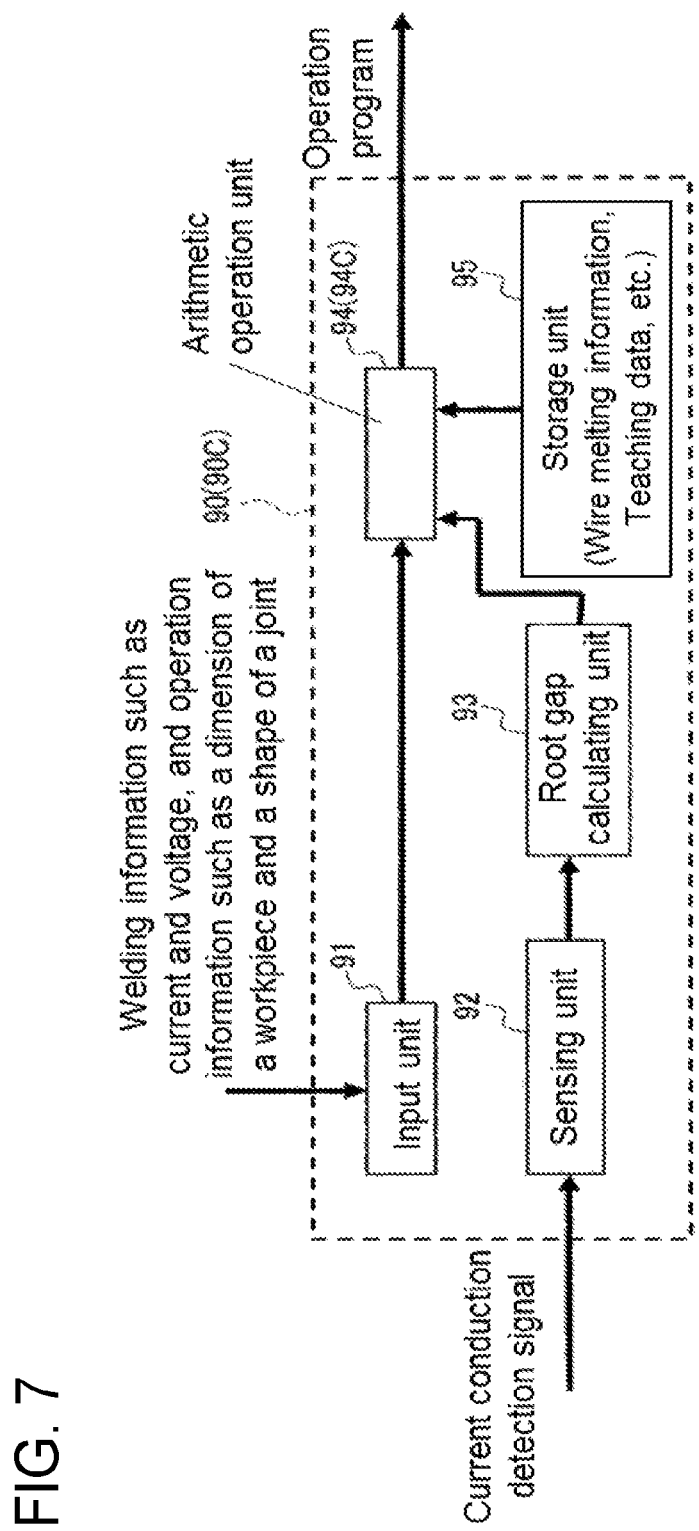
FIG. 7 is a block diagram showing a configuration of a welding control device provided in a welding device according to a first embodiment and a fourth embodiment of the invention.

The welding control device 90 controls operations of the rotary positioners 10, the carriage 20, the welding robot 30, the nozzle exchanging device 50, the nozzle cleaning device 60, the slag removing device 70 and the wire cutting device 80. Here as shown in FIG. 7, the welding control device 90 has an input unit 91, a sensing unit 92, a root gap calculating unit 93, an arithmetic operation unit 94, and a storage unit 95. Further, the storage unit 95 includes wire melting information. Of the units belonging to the welding control device 90, the units for controlling the operation of the welding robot 30 and the heat input thereto will be mainly described below. Description about the units for controlling the operations of the other devices (i.e., the rotary positioners 10, the carriage 20, the nozzle exchanging device 50, the nozzle cleaning device 60, the slag removing device 70 and the wire cutting device 80) will be omitted.

Welding information such as a set current, a set voltage, a set welding speed, etc. as master data or operation information about dimensions of the workpiece W and the welding joint are inputted to the input unit 91. The welding information and/or the operation information, and propriety of welding execution are inputted to the input unit 91 through input by a worker or through input of CAD data of the workpiece W. As shown in FIG. 7, the input unit 91 outputs the inputted information to the arithmetic operation unit 94. For example, a root gap of the workpiece W, position coordinates of the workpiece W, etc. may be inputted to the input unit 91 through the input by the worker or through the input of the CAD data of the workpiece W. In addition, teaching data such as an operation orbit of the robot may be inputted.

The sensing unit 92 detects the position coordinates of the workpiece W. The sensing unit 92 performs sensing using a laser sensor or touch sensing to detect the position coordinates of the workpiece W. According to the touch sensing, a sensing voltage is applied between the welding torch 31 supporting the welding wire set with a predetermined extension and the workpiece W, so as to detect a current conduction state based on contact between the welding wire and the workpiece W to thereby detect the position of the workpiece W. More specifically, a current conduction detection signal generated on contact with the workpiece W is inputted from the welding torch 31 performing the touch sensing, and the position coordinates of the workpiece W are detected based on the current conduction detection signal.

An example of the procedure of the touch sensing by the welding torch 31 will be described below. The example will be described below in the case where the workpiece W is constituted by a steel structure part (column) W1 and a steel structure part (diaphragm) W2, an L-shaped groove is formed between the two parts, and a backing member BM is disposed on a bottom portion of the groove.

First, in a first step of the procedure, the welding torch 31 supporting the welding wire having the predetermined extension is positioned at a sensing start position $P_S$, and a sensing voltage is applied between the welding wire and each of the workpiece parts W1 and W2. The sensing start position $P_S$ is set in advance at a position separated from a detection start position $P_1$ where detection of a surface W1$b$ of the workpiece part W1 is to be started, to the groove side by a distance A in parallel to the surface W1$b$.

Next, in a second step of the procedure, the welding torch 31 is moved in a −Y direction from the sensing start position $P_S$ to the detection start position $P_1$ where detection of the surface W1$b$ of the workpiece part W1 is to be started. Next, in a third step of the procedure, the welding torch 31 is moved in a +X direction from the detection start position $P_1$ to a position $P_2$. Then the welding wire is brought into contact with the surface W1$b$ of the workpiece part W1, and a current conduction detection signal generated thereby is outputted from the welding torch 31 to the sensing unit 92. Thus, the sensing unit 92 detects the position coordinates of the position $P_2$ of the surface W1$b$ of the workpiece part W1.

Next, in a fourth step of the procedure, the welding torch 31 is moved from the position $P_2$ to a position $P_3$ returned in the −X direction by a predetermined distance b (for example, 2 mm) prepared in advance. Next, in a fifth step of the procedure, the welding torch 31 is moved in a +Y direction from the position $P_3$ to a position $P_4$. Next, in a sixth step of the procedure, the welding torch 31 is moved from the position $P_4$ to a position $P_5$ by a predetermined distance D in the +X direction. As the distance D, a distance set by arithmetic operation based on a distance ratio of a groove depth C set in advance from the groove depth C and the return distance b after the detection of the surface W1$b$ of the workpiece part W1 may be used. Thus, a predetermined depth in the detection position $P_5$ relative to the set groove depth C from the surface W1$b$ of the workpiece part W1 is determined.

Next, in a seventh step of the procedure, the welding torch 31 is moved in the +Y direction from the position $P_5$ to a position $P_6$. Then the welding wire is brought into contact with the position $P_6$ of a groove face W2$a$ of the workpiece part W2, and a current conduction detection signal generated thereby is outputted from the welding torch 31 to the sensing unit 92. Thus, the sensing unit 92 detects the position coordinates of the position $P_6$ of the groove face W2$a$. Next, in an eighth step of the procedure, the welding torch 31 is moved from the position $P_6$ to a position $P_7$ in the −Y direction. Then the welding wire is brought into contact with the position $P_7$ of a groove face W1$a$ of the workpiece part W1, and a current conduction detection signal generated thereby is outputted from the welding torch 31 to the sensing unit 92. Thus, the sensing unit 92 detects the position coordinates of the position $P_7$ of the groove face W1$a$.

Next, in a ninth step of the procedure, the welding torch 31 is moved from the position $P_7$ to a position $P_8$ in the +Y direction. The position $P_8$ is a central position of the groove width between the position $P_6$ of the groove face W1$a$ and the position $P_7$ of the groove face W2$a$. The position $P_8$ is calculated by a not-shown groove width central position calculating unit, and inputted to the welding robot 30. After those positions are sensed by the welding torch 31, the sensing unit 92 outputs the calculated position coordinates of the positions $P_2$, $P_6$ and $P_7$ to the root gap calculating unit 93 as shown in FIG. 7.

Figure 8:
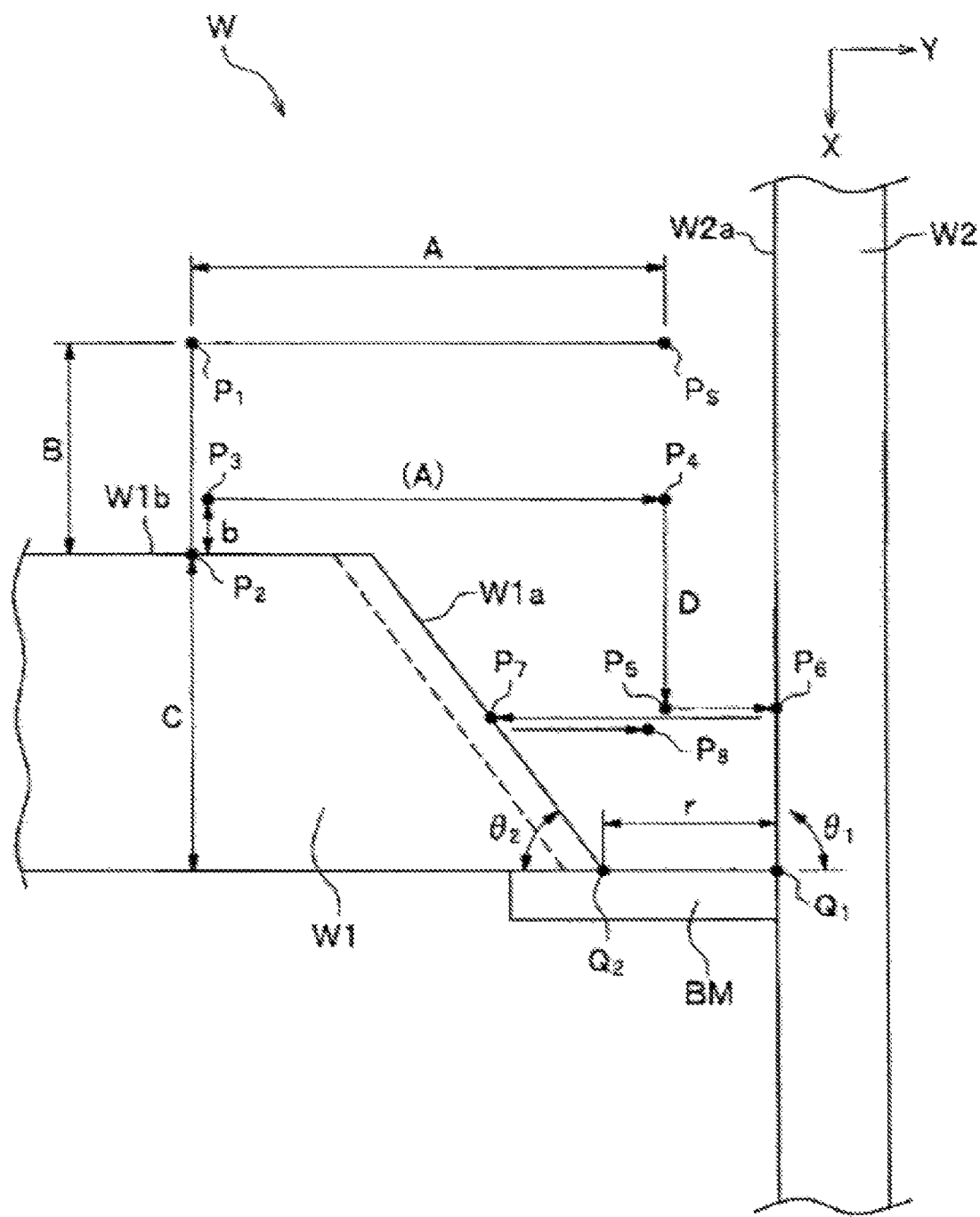
FIG. 8 is a schematic view showing a procedure of gap sensing by the welding device according to an embodiment of the invention.

The root gap calculating unit 93 calculates a root gap of the groove. For example, in the example of FIG. 8, the root gap calculating unit 93 calculates the root gap based on the detected position data of the groove faces W1$a$ and W2$a$ detected by the sensing unit 92, that is, the position coordinates of the detection positions $P_6$ and $P_7$ of the two groove faces in the groove width direction from the detection position $P_5$ at the predetermined depth relative to the set groove depth C from the surface W1$b$ of the workpiece part W1, the difference between the set groove depth C and the detection start position $P_1$, and angles θ1 and θ2 of the groove faces W1$a$ and W2$a$ set in advance. That is, the root gap calculating unit 93 calculates a groove root position $Q_1$ from the position coordinates of the position $P_6$ and the angle θ1 (90 degrees here) of the groove face W1$a$ as shown in FIG. 8. In addition, the root gap calculating unit 93 calculates a groove root position $Q_2$ from the position coordinates of the position $P_7$ and the angle θ2 of the groove face W2$a$ as shown in FIG. 8. The root gap calculating unit 93 calculates a distance r between the groove root position $Q_1$ and the groove root position $Q_2$ as a root gap, and outputs the root gap to the arithmetic operation unit 94.

Figure 9:
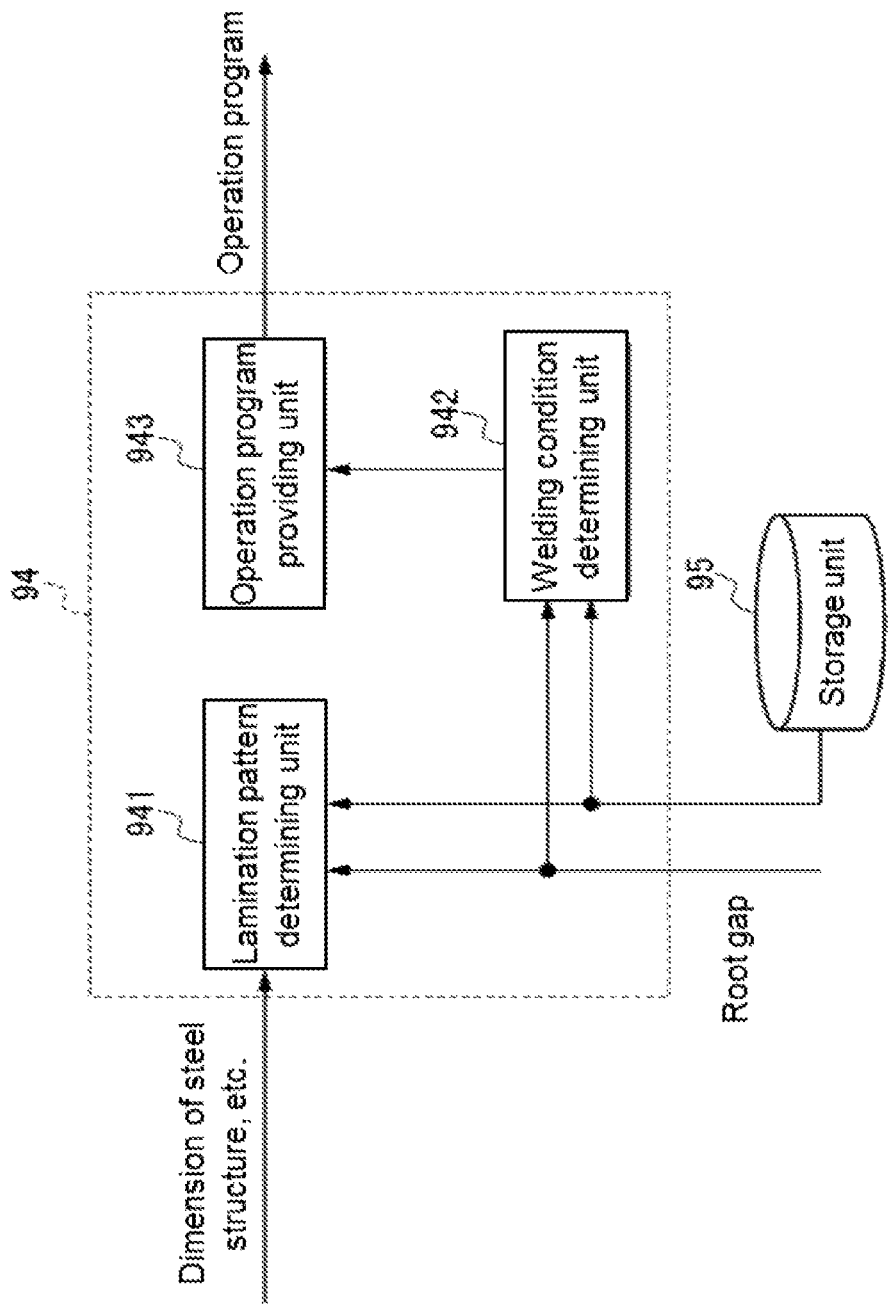
FIG. 9 is a block diagram showing a configuration of an arithmetic operation unit of the welding control device provided in the welding device according to the embodiment of the invention.

The arithmetic operation unit 94 automatically generates a lamination pattern and a welding condition in accordance with the welding information about intended welding and/or the operation information, and provides an operation program. Here as shown in FIG. 9, the arithmetic operation unit 94 has a lamination pattern determining unit 941, a welding condition determining unit 942, and an operation program providing unit 943.

The lamination pattern determining unit 941 determines a lamination pattern for a welding joint to be welded. Specifically the lamination pattern determining unit 941 selects and determines a lamination pattern corresponding to the welding joint to be welded, from a lamination pattern database stored in advance in the storage unit 95 for each dimension (for example, plate thickness) of the workpiece W inputted correspondingly to the welding joint to be welded, for each root gap, or for the dimension of the workpiece W and the root gap. That is, in the storage unit 95, a lamination pattern has been stored as a database for each dimension of the workpiece W, for each root gap, or for the dimension of the workpiece W and the root gap, and the lamination pattern determining unit 941 determines an optimum lamination pattern with reference to the database. The root gap used by the lamination pattern determining unit 941 may be a root gap of the workpiece W inputted through the input unit 91 by a worker, or a root gap of the workpiece W determined by sensing, that is, a root gap determined through the sensing unit 92 and the root gap calculating unit 93. In addition, the lamination pattern is preferably determined using both the dimension of the workpiece W and the root gap.

The welding condition determining unit 942 determines the welding condition for the welding joint to be welded. Specifically the welding condition determining unit 942 selects and determines the welding condition corresponding to the welding joint to be welded, from a welding condition database stored in advance in the storage unit 95 for each dimension (for example, plate thickness) of the workpiece W inputted correspondingly to the welding joint to be welded, for each root gap, or for the dimension of the workpiece W and the root gap, and based on wire melting information which will be described later. That is, in the storage unit 95, welding information has been stored as a database for each wire melting information, for each dimension of the workpiece W, for each root gap, or for the dimension of the workpiece W and the root gap. With reference to the database, the welding condition determining unit 942 determines optimum welding conditions (e.g., welding current, welding voltage, welding speed, and weaving conditions) in which the amount of heat input can be prevented from exceeding a predetermined one. For example, welding conditions are stored on the database for each plate thickness, and welding conditions are extracted in accordance with the plate thickness inputted in advance (or inputted through a CAD or a vision sensor), and calculated in accordance with the result of the root gap. Thus, the welding conditions can be determined.

The root gap used by the welding condition determining unit 942 may be a root gap of the workpiece W inputted through the input unit 91 by a worker, or a root gap of the workpiece W determined by sensing, that is, a root gap determined through the sensing unit 92 and the root gap calculating unit 93. In addition, a welding condition is preferably determined using both the dimension of the workpiece W and the root gap together with the wire melting information.

The operation program providing unit 943 provides an operation program of the welding robot 30. Specifically the operation program providing unit 943 provides a robot operation program including an operation orbit of the welding robot 30 in accordance with the lamination pattern determined by the lamination pattern determining unit 941, and the welding condition determined by the welding condition determining unit 942, and outputs the robot operation program to the welding robot 30. That is, the operation program providing unit 943 provides a program for teaching a procedure required for welding in each pass of the welding joint to be welded before the welding robot 30 executes a final welding process. This teaching program includes, as the welding condition, information about a welding current, a welding voltage, a welding speed, an extension of the welding torch 31, a current value corresponding to a wire feeding rate, etc., or information about an operation orbit of the welding robot 30, an arc ON position, a final welding start position, a crater forming position, a start position of seam processing, etc.

The storage unit 95 stores operation information of a lamination pattern, and welding information about a welding current, an arc voltage, a welding speed, etc., for each wire metaling information, for each dimension of the workpiece W, for each root gap, or for the dimension of the workpiece W and the root gap. Specifically, the storage unit 95 is implemented by a memory, a hard disk, etc. that can store data. Here as shown in FIG. 7, the storage unit 95 is provided inside the welding control device 90. However, the storage unit 95 may be provided outside the welding control device 90, for example, inside a welding power supply, or the storage unit may be divided into pieces to be provided inside and outside the welding control device 90. For example, only the wire melting information may be stored in a piece of the storage unit inside the welding power supply.

(Wire Melting Information)

Figure 10:
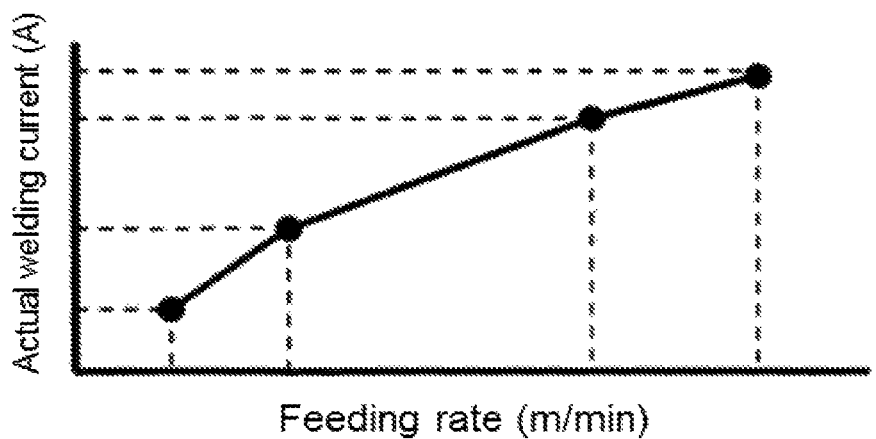
FIG. 10 is a graph showing a relation between a feeding rate of a welding wire and an actual welding current.

As the wire melting information stored in the storage unit 95, parameters representing a relation between a wire feeding rate and a proper welding current value are formed into a database for each wire composition (kind of steel) as shown in FIG. 10. The proper welding current value is an actual welding current value to be outputted when welding is performed with a proper voltage for the wire feeding rate. Assume that the relation between the feeding rate and the proper welding current is regarded as an inclination of [proper welding current/feeding rate]. In this case, when the inclination is 12 or more, the welding wire has a less melty property, that is, it is necessary to increase the welding current in order to melt the wire. Accordingly, weld penetration can be secured easily due to increased energy of the welding current. Thus, the quality after the welding is improved. On the other hand, when the inclination is 125 or less, the welding wire has a more melty property, that is, it is not necessary to require a high current in order to melt the wire. Thus, an actual welding current per amount of deposition decreases to make it easier to manage heat input not to exceed a predetermined one. Accordingly, the relation is preferably set within a range of 12≤proper welding current/feeding rate≤125. In addition, the derived parameters are preferably from feeding rates at three or more points in terms of accuracy of the parameters.

It is also preferable that parameters representing a relation between the wire feeding rate and the proper welding current value for each kind of gas, for each wire diameter and for each wire extension as well as for each wire composition (kind of steel) are formed into a database. The wire diameter and the wire extension contribute particularly to the melting property of the wire. It is therefore preferable that the wire diameter and the wire extension are regulated within proper ranges as the wire melting information.

(Wire Diameter)

The wire diameter contributes to electric resistance between an electrode and the workpiece. When the amount of deposition is fixed, the electric resistance decreases as the wire diameter is thicker. Thus, the outputted welding current tends to increase. As the wire diameter is thinner, the electric resistance increases. Thus, the outputted welding current tends to decrease. Assume that a steel structure is a target. In this case, when the wire diameter is 1.0 mm or more, weld penetration can be secured easily. Thus, the quality after the welding is improved. On the other hand, when the wire diameter is 2.0 mm or less, an actual welding current per amount of deposition decreases to make it easier to manage the heat input not to exceed the predetermined one.

(Wire Extension)

The wire extension also contributes to the electric resistance between the electrode and the workpiece in the same manner as the wire diameter. When the amount of deposition is fixed, the electric resistance increases due to Joule heat as the wire extension is longer. Thus, the outputted welding current tends to decrease. As the wire extension is shorter, the electric resistance decreases. Thus, the outputted welding current tends to increase. Assume that a steel structure is a target. In this case, when the extension is 35 mm or less, weld penetration can be secured easily. Thus, the quality after the welding is improved. On the other hand, when the extension is 10 mm or more, an actual welding current per amount of deposition can be decreased to make it easier to manage the heat input not to exceed the predetermined one.

(Welding Wire)

The kind of the welding wire is not limited particularly. The welding wire may be a solid wire, or a flux cored wire. Incidentally, the flux cored wire is constituted by a cylindrical shell, and flux charged into the inside of the shell. The welding wire with the flux may have a form of either a seamless one having no seam in the shell or a seam one having a seam in the shell. Further, the wire surface (i.e., outer surface of the shell) of each of the solid wire and the flux cored wire may be plated with copper or may be not plated.

The chemical composition of the welding wire has influence on the electric resistance between the electrode and the workpiece. When the amount of deposition is fixed, the welding current to be outputted increases as the electric resistance is lower. Thus, it is difficult to manage the heat input not to exceed the predetermined one. On the other hand, as the electric resistance is higher, the welding current to be outputted decreases. Thus, a welding defect such as lack of penetration or failure in welding tends to occur to adversely affect the quality after the welding. Thus, the dosage of each element is preferably regulated within a proper range. In addition, the dosage of each element also has influence on welding workability such as slag removability or spatters. The preferred numerical ranges about the contents of components of the welding wire will be described below together with reasons of their limits. When the wire is a flux cored wire, the content of each component is expressed by a total content of the component in the shell and the flux, and regulated by a ratio of the mass of the component contained in the wire (i.e., shell and flux) relative to the total mass of the wire.

[C: 0.50 Mass % or Less (Including 0 Mass %)]

C in the welding wire is generally added in order to enhance the strength of deposited metal. When the content of C is small, there is no adverse influence on the electric resistance or the quality after the welding. Therefore, the lower limit is not set for the content of C. On the other hand, when the content of C is large to exceed 0.50 mass %, C is bonded with oxygen during welding to form CO gas, which generates bubbles in surfaces of droplets. The droplets may fly out to increase the amount of generated spatters to thereby deteriorate the quality after the welding. It is therefore preferable that the content of C is made not higher than 0.50 mass %. In order to secure strength, the lower limit of the content of C is more preferably set at 0.01 mass %, that is, the content of C is preferably set within a range of 0.01 to 0.50 mass %.

[Si: 0.10 to 2.00 Mass %]

Si in the welding wire is a deoxidizing element. Si is an element that is generally added to secure strength or toughness in the deposited metal. As the content of Si increases, the electric resistance of the welding wire increases. In addition, slag generated by the deoxidization of Si is glassy to be separated easily. It is therefore preferable that the content of Si is 0.10 mass % or more. On the other hand, the content of Si is preferably reduced to 2.00 mass % or less in order to make it possible to prevent entanglement of slag caused by excessive generation of the slag or failure in penetration caused by excessive increase of the electric resistance.

[Mn: 0.10 to 3.00 Mass %]

Mn in the welding wire has an effect as deoxidizer or sulfur trapping agent in the same manner as Si. Mn is an element that is generally added to secure strength or toughness in the deposited metal. In the same manner as Si, the electric resistance of the welding wire increases as the content of Mn increases. Therefore, the content of Mn is preferably 0.10 mass % or more in terms of management of heat input. On the other hand, the content of Mn is preferably reduced to 3.00 mass % or less in order to make it possible to prevent entanglement of slag caused by excessive generation of the slag or failure in penetration caused by excessive increase of the electric resistance.

[S: 0.0500 Mass % or Less (Including 0%)]

S is an impurity element. It is preferable to make the content of S as small as possible. Therefore, the lower limit is not set for the content of S. When the content of S is large to exceed 0.0500 mass %, failure in welding such as cracking in the deposited metal may occur to adversely affect the quality after the welding. It is therefore preferable that the content of S is set at 0.0500 mass % or less (including 0%).

[Ti: 0.80 Mass % or Less (Including 0%), Al: 0.80 Mass % or Less (Including 0%)]

Ti and Al are strong deoxidizing elements. Ti and Al are elements that are generally added to secure strength or toughness in the deposited metal. When the contents of Ti and Al are small, there is no great adverse influence on the electric resistance or the quality after the welding. Therefore, no lower limit is set for each of the content of Ti and Al. However, when each of the content of Ti and Al exceeds 0.80 mass %, slag removability tends to deteriorate. It is therefore preferable that each of the contents of Ti and Al is set at 0.80 mass % or less.

[Mo, Ni, Cr, Cu, B]

Further, Mo, Ni, Cr, Cu, and B may be added in order to improve strength or toughness of the deposited metal. When the content of each element is added excessively, cracking tends to occur. It is therefore preferable to set the contents of the elements within the following ranges respectively. Incidentally, a component as copper plating is contained in Cu.

Mo: 5.00 mass % or less
Ni: 20.00 mass % or less
Cr: 30.00 mass % or less
B: 0.0100 mass % or less
$[0.10 \leq Si/\{1+(Al+Ti)\}]$ Slag generated from Si is glassy to be easily removed, but slag generated from Al or Ti is hardly removed. Therefore, slag can be removed easily as the value $Si/\{1+(Al+Ti)\}$ which is a ratio between Si, Ti and Al forming the slag is larger. In addition, the slag removability influences the amount of heat input. The slag removability tends to deteriorate as the amount of heat input increases. From the relationship between the wire elements and the amount of heat input relating to the slag removability, the slag removability is improved when the value Si/{1+(Al+Ti)} is 0.10 or more. Thus, a slag removing step can be performed easily to make the welding workability more efficient. The value Si/{1+(Al+Ti)} is preferably set at 2.00 or less.

The kind of shielding gas is not limited particularly. The shielding gas may be 100% $CO_2$ gas or Ar-20% $CO_2$ gas, which is generally used. In addition, gas having a composition in which a fixed amount of oxygen or nitrogen is contained in Ar or $CO_2$ gas may be used.

(Processing Procedure of First Embodiment)

Figure 11:
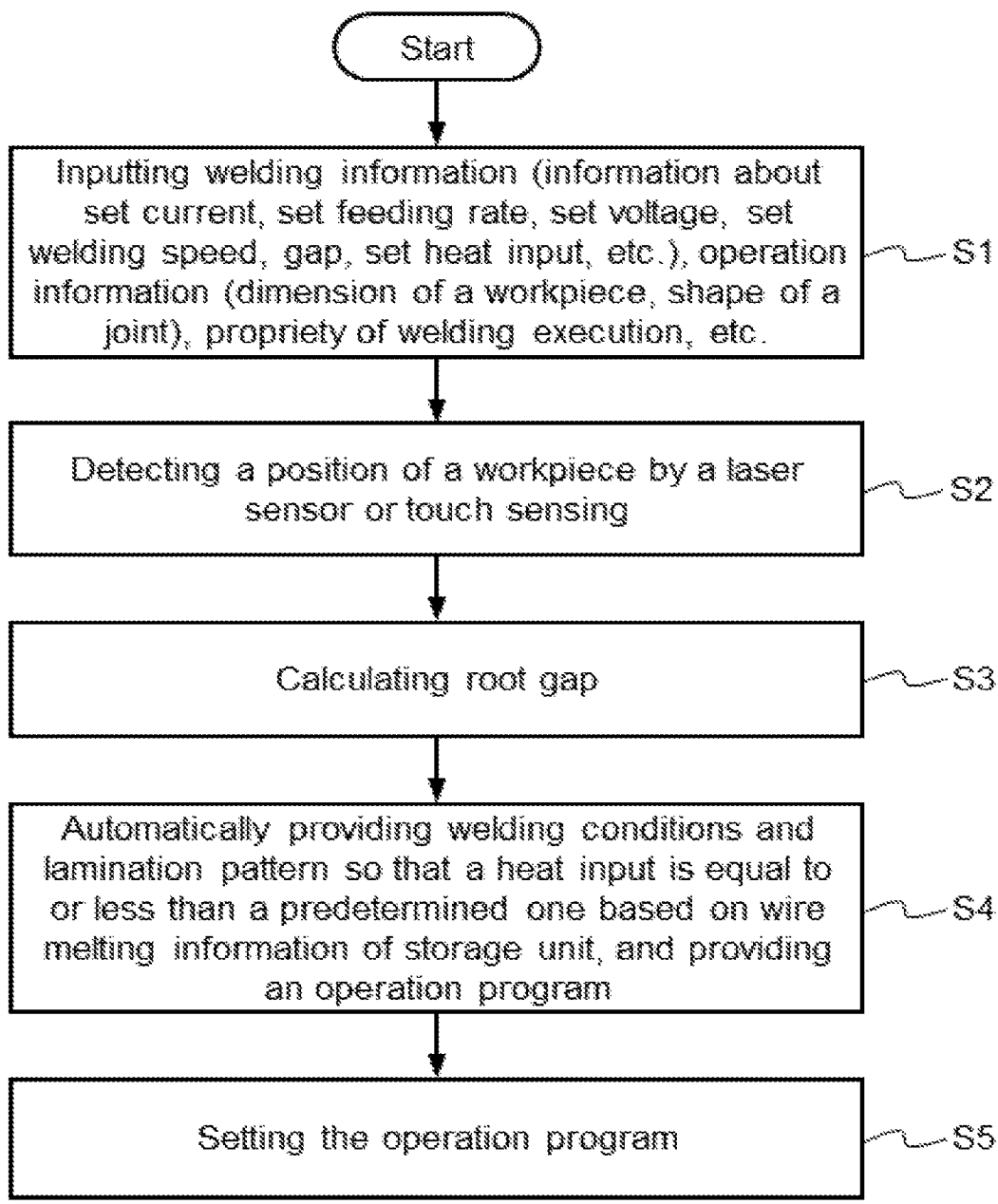
FIG. 11 is a flow chart showing a processing procedure of the welding control unit provided in the welding device according to the first embodiment of the invention.
Figure 12:
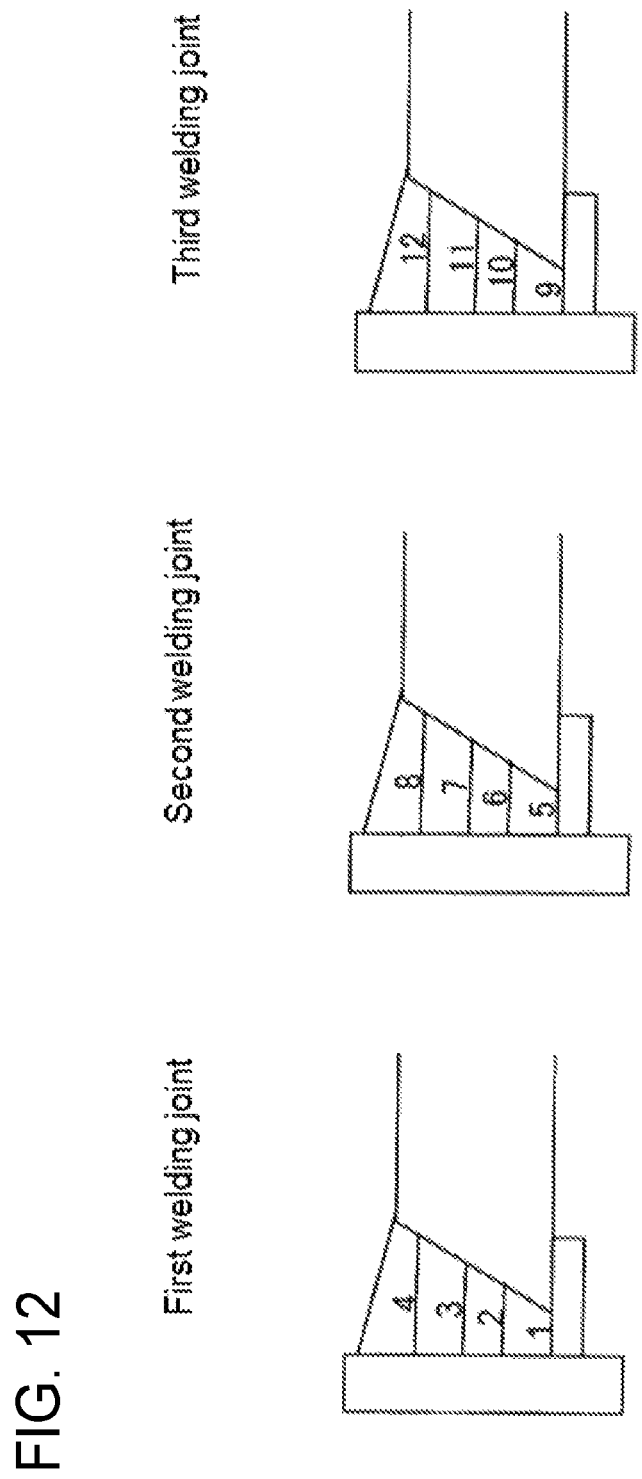
FIG. 12 is a view for illustrating a pass dividing function of all-pass batch.
Figure 13:
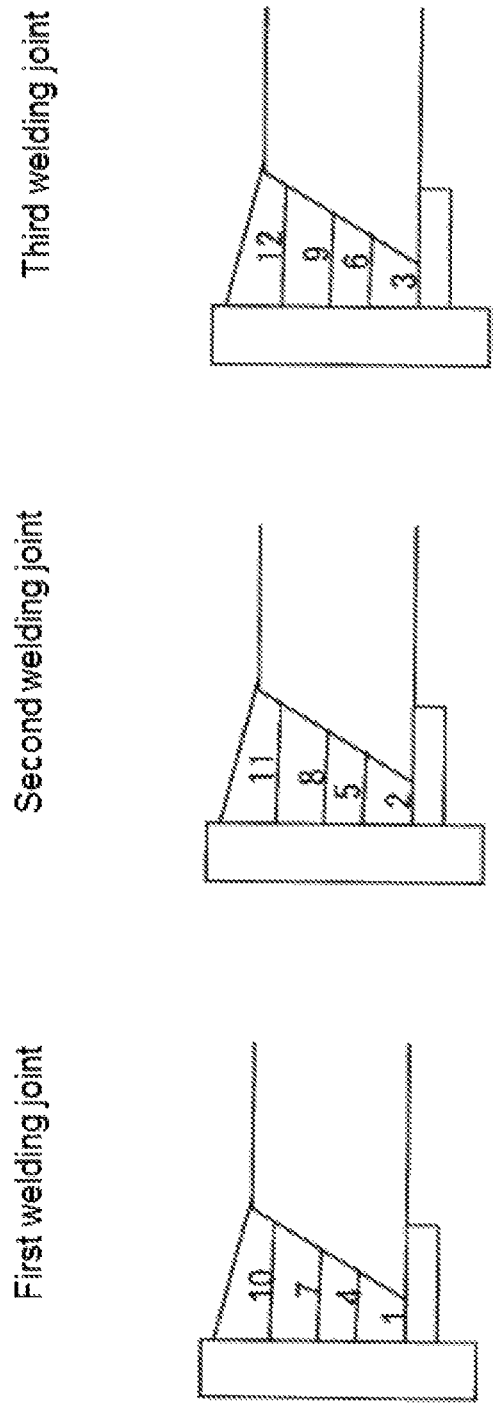
FIG. 13 is a view for illustrating a pass dividing function of pass division.
Figure 14:
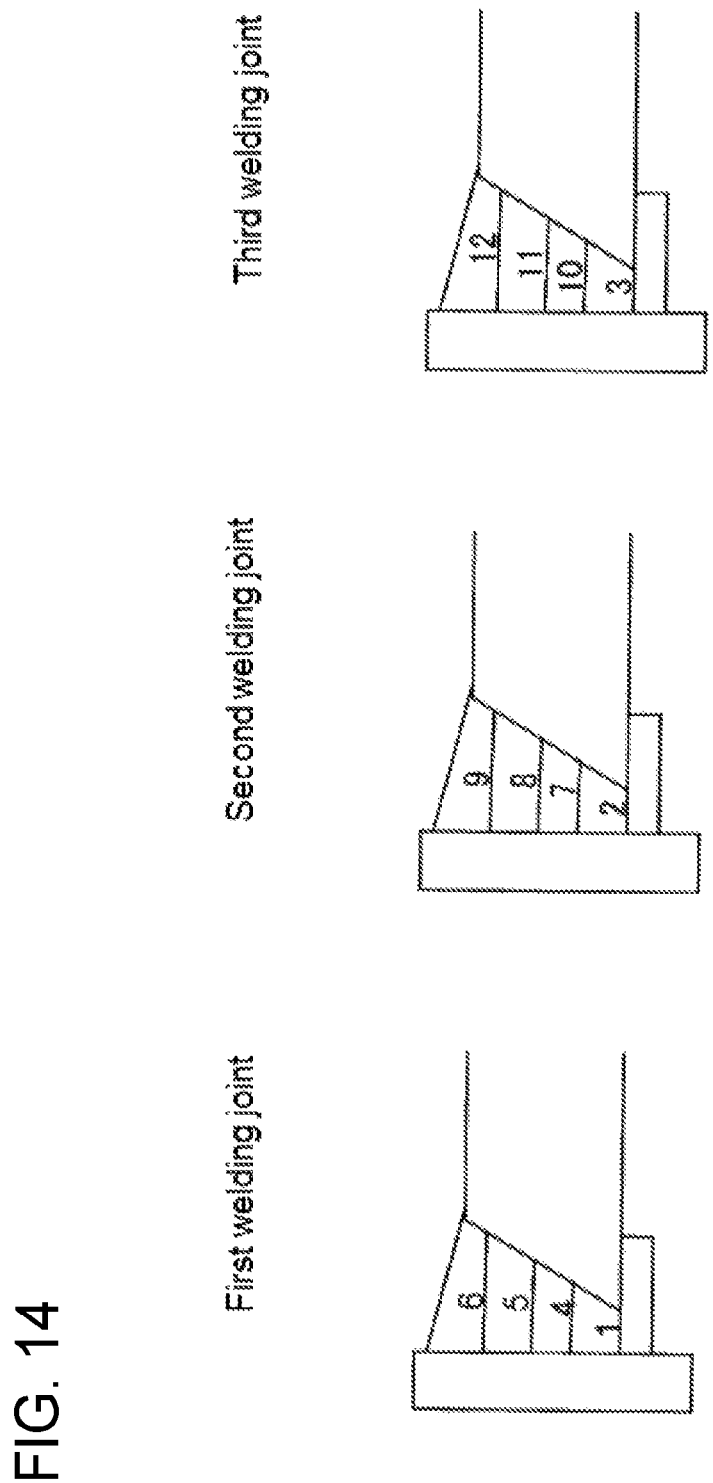
FIG. 14 is a view for illustrating a pass dividing function in which only a first pass is divided.

In the welding control device 90, welding information and/or operation information such as dimensions of the workpiece W, the shape of the welding joint, etc., and information about propriety of welding execution are inputted to the input unit 91 through input by a worker or through input of CAD data of the workpiece W, with reference to FIG. 7 and FIG. 11 (Step S1). On this occasion, a value of heat input as reference is inputted as the welding information. The value of heat input can be expressed by Expression (1). Therefore, the value of heat input may be replaced by inputting values of a set welding current, a set arc voltage, and a set welding speed.

$$\text{heat input } H=(60\times \text{arc voltage } E\times \text{welding current } I)/\text{welding speed } V \quad (1)$$

Next, the welding control device 90 uses the sensing unit 92 to detect the position of the workpiece W (Step S2). Next, the welding control device 90 uses the root gap calculating unit 93 to calculate a root gap based on the position coordinates of the positions $P_6$ and $P_7$ of the groove faces W1a and W2a detected by the sensing unit 92, the difference between the set groove depth C and the detection start position $P_1$, and the angles θ1 and θ2 of the groove faces W1a and W2a set in advance (Step S3).

Next, based on the root gap determined by the root gap calculating unit 93 and the wire melting information of the storage unit 95, the welding control device 90 uses the arithmetic operation unit 94 to automatically generate a welding condition and a lamination pattern so as to prevent the amount of heat input from exceeding the predetermined one, and provides an operation program (Step S4). Then the welding control device 90 outputs the operation program provided by the arithmetic operation unit 94 to the welding robot 30, and sets the operation program therein (Step S5). Welding by the welding robot 30 is started after the aforementioned processing procedure.

(Pass Dividing Function)

In a case of multilayer welding with a plurality of welding joints, it is preferable to set pass division as one piece of the welding information inputted to the input unit 91, so that the order in which laminated layers should be provided can be changed for each joint. One example of systems for setting pass division is a system of "all-pass batch", shown in FIG. 12, in which one joint is welded over all passes thereof before a next joint is welded. Another example is a system of "pass division", shown in FIG. 13, in which each joint is welded from one pass to another pass. Another example is a system of "division in only first pass", shown in FIG. 14, in which only the first pass of each joint is dividedly welded. The setting of such a system makes it easy to manage inter-pass temperature, so that the welding workability can be made more efficient. That is, according to the system of "pass division", each joint is welded in only one pass, so that the inter-pass temperature can be decreased. In addition, the inter-pass timing can be matched with the timing when slag is removed manually. On the other hand, when a thick plate is welded, a bead may be broken in welding of a first layer during unmanned operation. According to the system of "division in only first pass", only the first layer can be welded beforehand.

Second Embodiment

Figure 15:
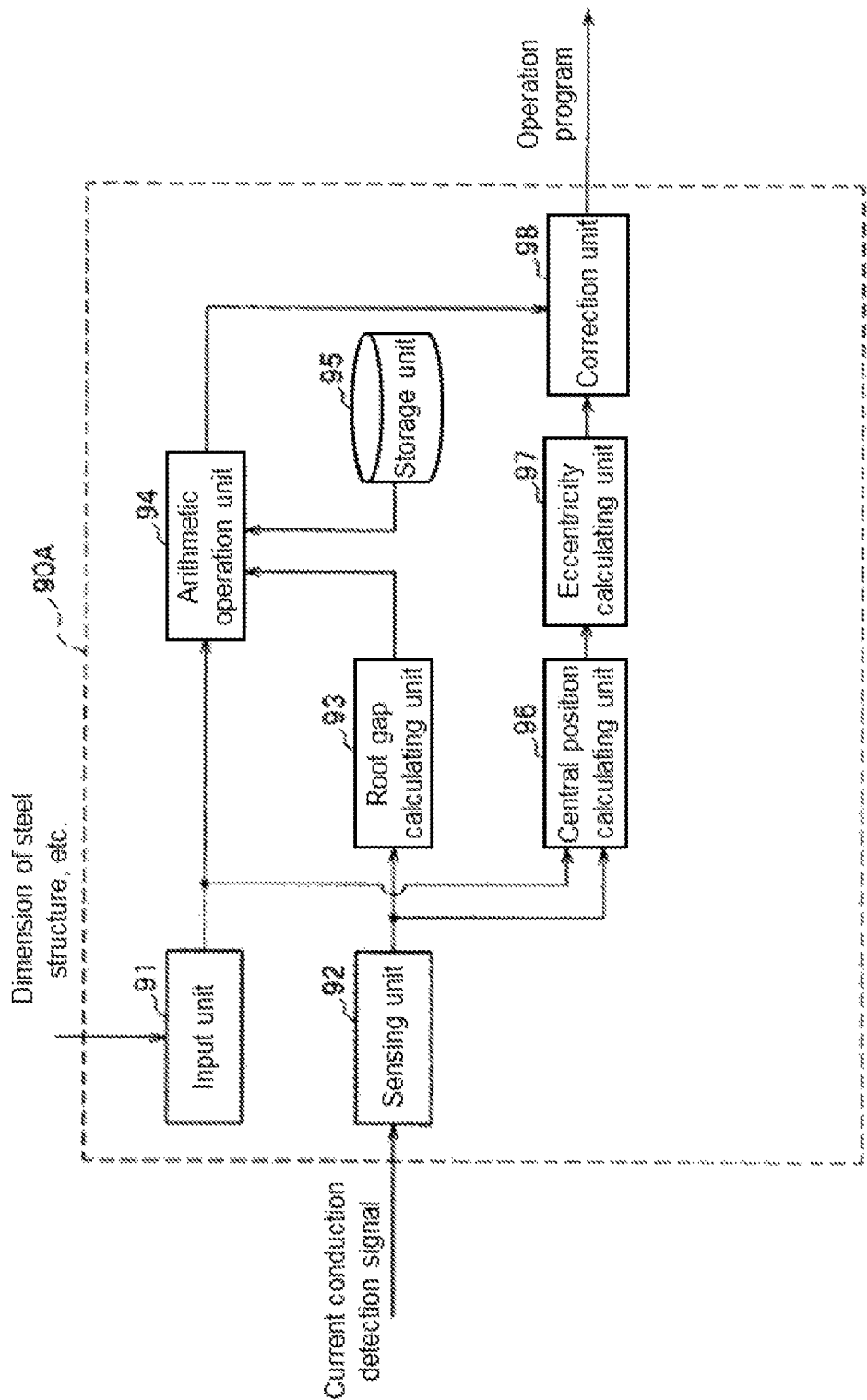
FIG. 15 is a block diagram showing a configuration of a welding control device provided in a welding device according to a second embodiment of the invention.

A welding device 1A according to a second embodiment of the invention will be described below with reference to FIG. 15. The welding device 1A has the same configuration as the welding device 1 according to the first embodiment, except that a welding control device 90A is provided in place of the welding control device 90, as shown in FIG. 1 and FIG. 15. Accordingly, different points from the welding device 1 will be mainly explained below, and detailed description about constituents overlapped with those of the welding device 1 and a processing procedure of the welding device 1A will be omitted.

In the welding control device 90A, a function of correcting the operation program based on eccentricity of the steel structure W is added to the aforementioned welding control device 90. As shown in FIG. 15, the welding control apparatus 90A has a central position calculating unit 96, an eccentricity calculating unit 97, and a correction unit 98 in addition to the input unit 91, the sensing unit 92, the root gap calculating unit 93, the arithmetic operation unit 94, and the storage unit 95.

The central position calculating unit 96 calculates the central position of the steel structure W. Specifically as shown in FIG. 15, the central position calculating unit 96 calculates the central position of the steel structure W from the dimensions of the steel structure W inputted through the input unit 91, and the position coordinates of the steel structure W detected by the sensing unit 92. Then the central position calculating unit 96 outputs the central position of the steel structure W to the eccentricity calculating unit 97 as shown in FIG. 15.

The eccentricity calculating unit 97 calculates eccentricity of the steel structure W. Specifically the eccentricity calculating unit 97 calculates the eccentricity from the position coordinates of the rotation center position of each rotary positioner 10 set in advance, and the central position of the steel structure W calculated by the central position calculating unit 96. The eccentricity is an amount of deviation of the steel structure W relative to the rotation center of the rotary positioner 10. Then the eccentricity calculating unit 97 outputs the eccentricity of the steel structure W to the correction unit 98 as shown in FIG. 15.

The correction unit 98 corrects the robot operation orbit provided by the arithmetic operation unit 94. Specifically as shown in FIG. 7, the correction unit 98 corrects the robot operation orbit included in the operation program provided by the operation program providing unit 943 (see FIG. 9) of the arithmetic operation unit 94, in accordance with the eccentricity calculated by the eccentricity calculating unit 97. That is, although the operation program provided by the arithmetic operation unit 94 is provided on the assumption that the eccentricity of the steel structure W with respect to the rotation center of the rotary positioner 10 is zero, the operation program can be corrected by the correction unit 98 based on the eccentricity. A specific example of a method for correcting the robot operation orbit by the correction unit 98 include a method in which correction data of the robot operation orbit in accordance with each eccentricity are experimentally obtained in advance, and a piece of correction data is selected and used in accordance with the eccentricity calculated by the eccentricity calculating unit 97. Then the correction unit 98 outputs the operation program corrected thus to the welding robot 30.

In the welding device 1A configured thus, the central position of the steel structure W can be calculated by the central position calculating unit 96, and the eccentricity of the steel structure W can be calculated by the eccentricity calculating unit 97. Thus, the welded apparatus 1A can perform welding correctly even if the steel structure W is rotated with eccentricity by the rotary positioners 10.

Third Embodiment

Figure 16:
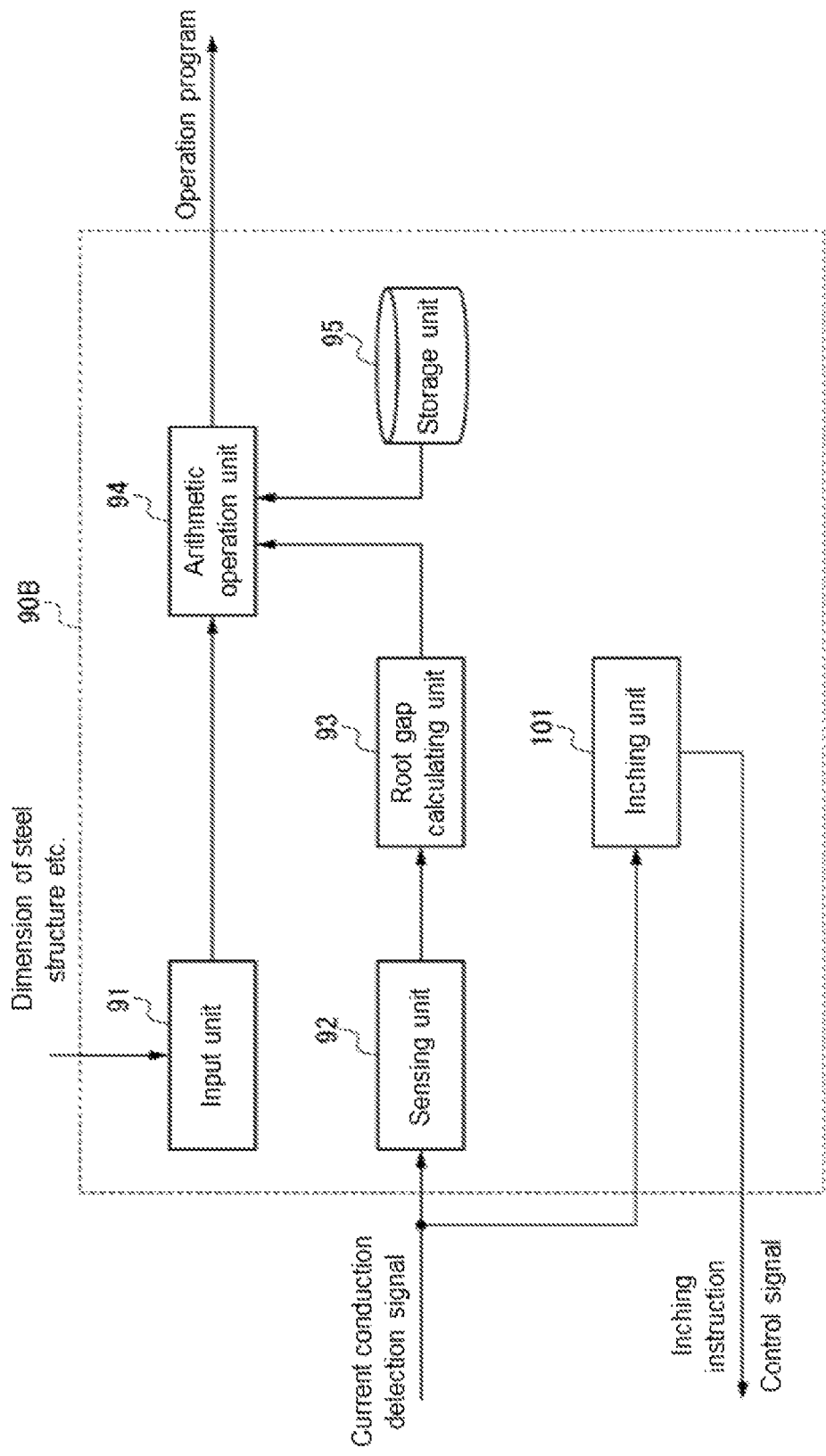
FIG. 16 is a block diagram showing a configuration of a welding control device provided in a welding device according to a third embodiment of the invention.

A welding device 1B according to a third embodiment of the invention will be described below with reference to FIG. 16 to FIG. 18F. The welding device 1B has the same configuration as the welding device 1 according to the first embodiment, except that a welding control device 90B is provided in place of the welding control device 90, as shown in FIG. 1 and FIG. 16. Accordingly, different points from the welding device 1 will be mainly explained below, and detailed description about constituents overlapped with those of the welding device 1 and a processing procedure of the welding device 1B will be omitted.

In the welding control device 90B, a function of inching to the steel structure W is added to the aforementioned welding control device 90. As shown in FIG. 16, the welding control apparatus 90B has an inching unit 101 in addition to the input unit 91, the sensing unit 92, the root gap calculating unit 93, the arithmetic operation unit 94, and the storage unit 95.

The inching unit 101 inches the welding wire protruding from the welding torch 31. Specifically the inching unit 101 performs inching operation at the welding start position of the welding torch 31 so that the welding wire to which a sensing voltage is applied is moved toward the steel structure W. Next, the inching unit 101 detects short-circuit as soon as the end of the welding wire touches the steel structure W, and confirms current conduction between the welding wire and the steel structure W. Next, the inching unit 101 performs operation for inching the welding wire in an opposite direction by a predetermined length. The inching unit 101 supplies predetermined welding power to the welding wire at the welding start position of the welding torch 31, generates a control signal to ignite an arc to thereby start welding, and outputs the control signal to the welding robot 30 as shown in FIG. 16.

An example of the inching operation by the inching unit 101 will be described below with reference to FIG. 17A to FIG. 17F and FIG. 18A to FIG. 18F. The following description will be made about a case where the steel structure W is constituted by a steel structure part (column) W3 and a steel structure part (diaphragm) W4, an L-shaped groove is formed between the two parts, and a backing member BM is disposed on a bottom portion of the groove, as shown in FIG. 17A to FIG. 17F and FIG. 18A to FIG. 18F.

Figure 17A:
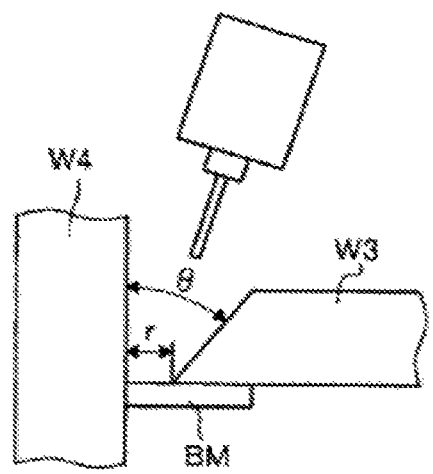
FIG. 17A is a schematic view showing a procedure of an inching operation performed by the welding control device provided in the welding device according to the third embodiment of the invention.
Figure 17B:
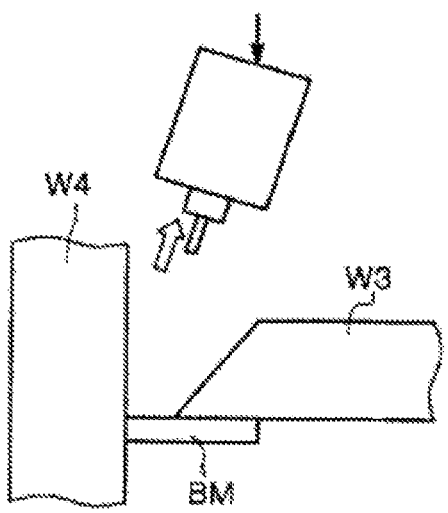
FIG. 17B is a schematic view showing the procedure of the inching operation performed by the welding control device provided in the welding device according to the third embodiment of the invention.

First, before the welding torch 31 in an initial state as shown in FIG. 17A is moved to reach the groove which is a joint portion between the steel structure part W3 and the steel structure part W4 in an arc start position and where the backing member BM is disposed, the inching unit 101 cuts the welding wire or performs reverse inching operation on the welding wire to make the extension of the welding wire at the end of the welding torch 31 shorter than the extension during welding, as shown in FIG. 17B. In FIG. 17A, θ represents an angle of the groove, and r designates a root gap.

Figure 17C:
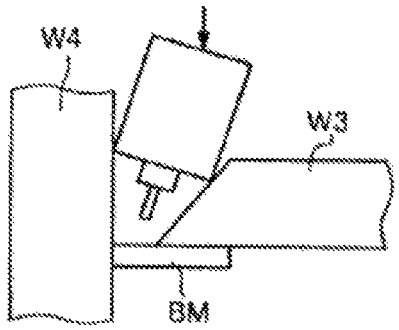
FIG. 17C is a schematic view showing the procedure of the inching operation performed by the welding control device provided in the welding device according to the third embodiment of the invention.

Next, as shown in FIG. 17C, the inching unit 101 moves the welding torch 31, in which the welding wire at the end of the welding torch 31 is made shorter than the extension during welding, to the arc start position. In this state, a sensing voltage is applied to the welding wire to perform wire inching operation.

Figure 17D:
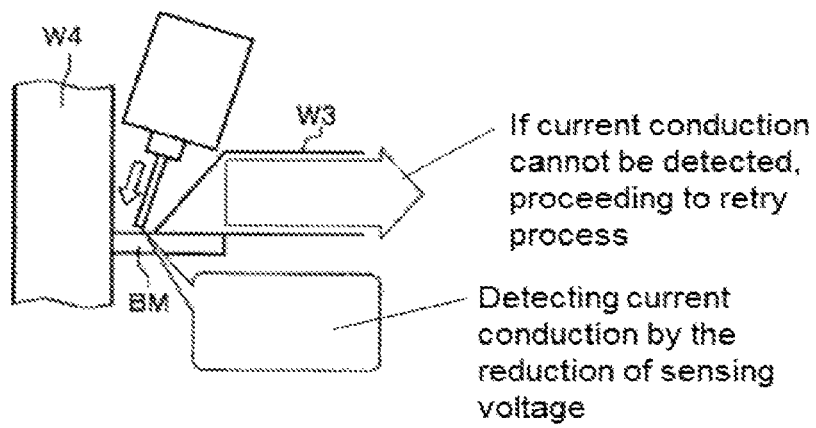
FIG. 17D is a schematic view showing the procedure of the inching operation performed by the welding control device provided in the welding device according to the third embodiment of the invention.
Figure 17E:
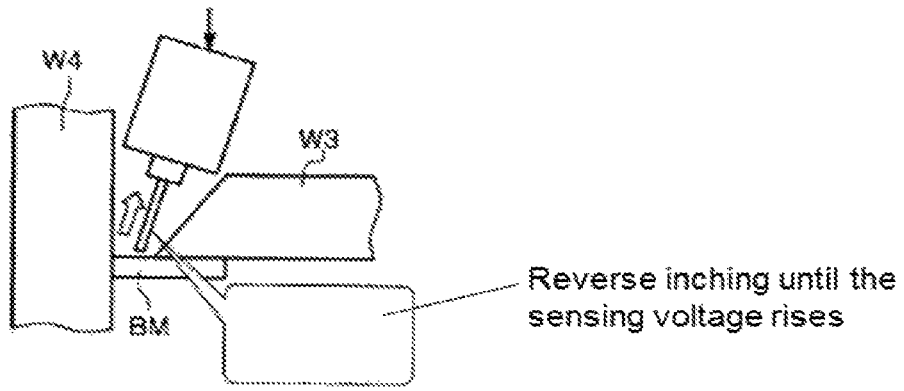
FIG. 17E is a schematic view showing the procedure of the inching operation performed by the welding control device provided in the welding device according to the third embodiment of the invention.
Figure 17F:
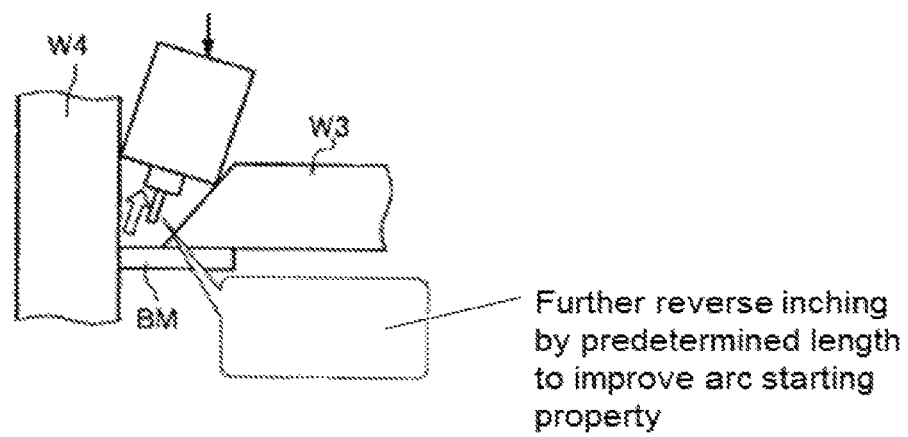
FIG. 17F is a schematic view showing the procedure of the inching operation performed by the welding control device provided in the welding device according to the third embodiment of the invention.

Next, during the inching operation on the welding wire, the inching unit 101 detects decrease of the sensing voltage to thereby detect current conduction between the welding wire and each of the steel structure parts W3 and W4 as shown in FIG. 17D before the inching operation reaches a maximum wire inching amount, for example, 20 mm. When the welding start position can be detected thus, the inching unit 101 performs inching operation in an opposite direction until the welding wire leaves the steel structure parts W3 and W4 to thereby increase the sensing voltage, as shown in FIG. 17E. Then the inching unit 101 performs inching operation on the welding wire in the opposite direction by a predetermined length, for example, 5 mm, to thereby improve an arc starting property, as shown in FIG. 17F. After that, the inching unit 101 starts an arc to start welding.

Figure 18A:
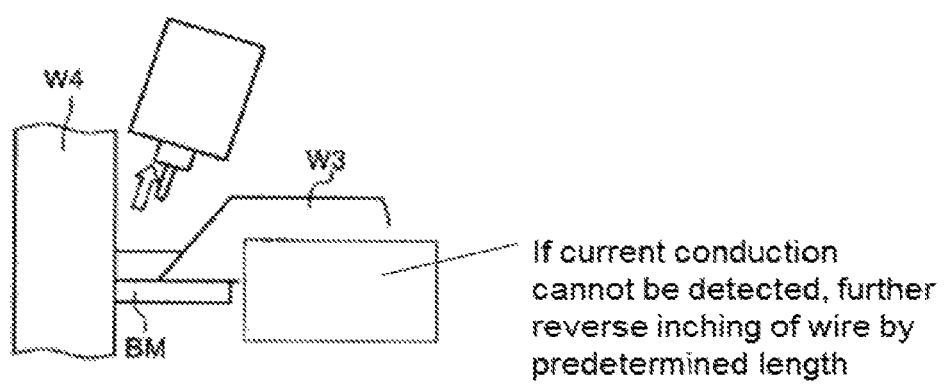
FIG. 18A is a schematic view showing the procedure of the inching operation performed by the welding control device provided in the welding device according to the third embodiment of the invention.
Figure 18B:
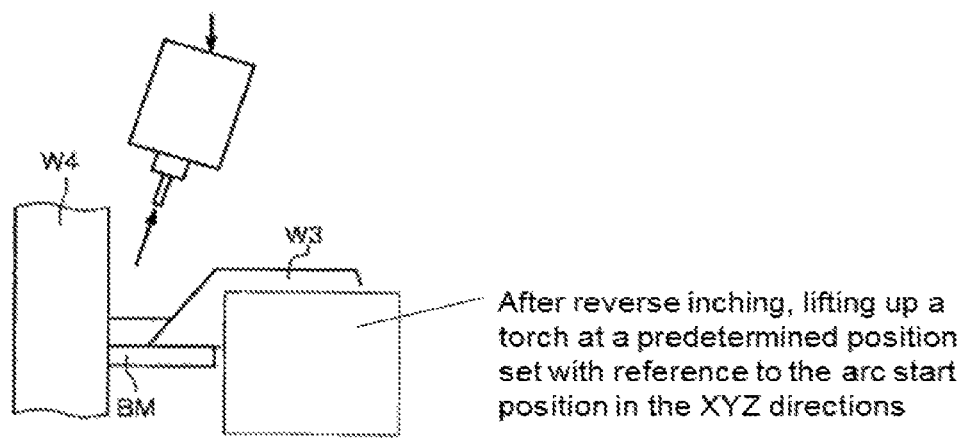
FIG. 18B is a schematic view showing the procedure of the inching operation performed by the welding control device provided in the welding device according to the third embodiment of the invention.

Here, even if the inching operation reaches the maximum wire inching amount, there may be a case where the current conduction between the welding wire and each steel structure part W3, W4 cannot be detected during the inching operation on the welding wire. When the number of retrieving times for the predetermined position where the arc can be started is, for example, smaller than three, the inching unit 101 concludes that current conduction cannot be detected at the present position, and the inching unit 101 tries to retrieve again at a different position, as shown in FIG. 17D. In addition, the inching unit 101 lifts up the welding torch 31 by a predetermined distance, for example, 5 mm as shown in FIG. 18A, and performs inching operation on the welding wire in the opposite direction, for example, by 15 mm, so as to lift up the welding torch 31 at a position set with reference to the arc start position in the XYZ directions as shown in FIG. 18B.

Figure 18C:
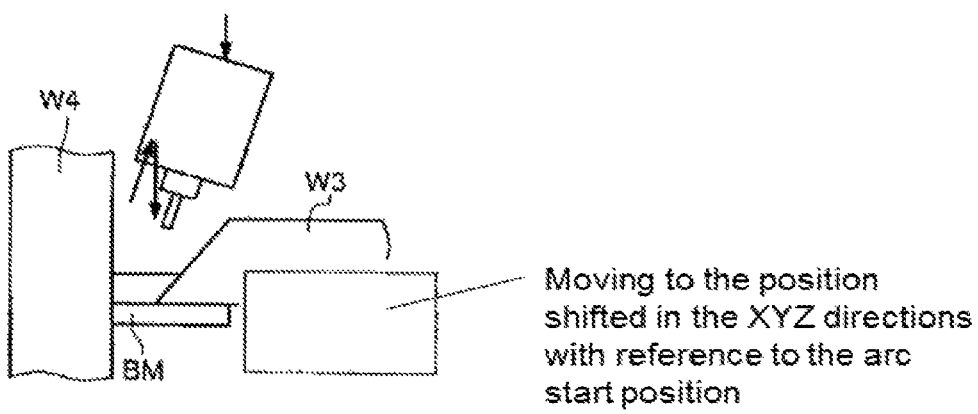
FIG. 18C is a schematic view showing the procedure of the inching operation performed by the welding control device provided in the welding device according to the third embodiment of the invention.
Figure 18D:
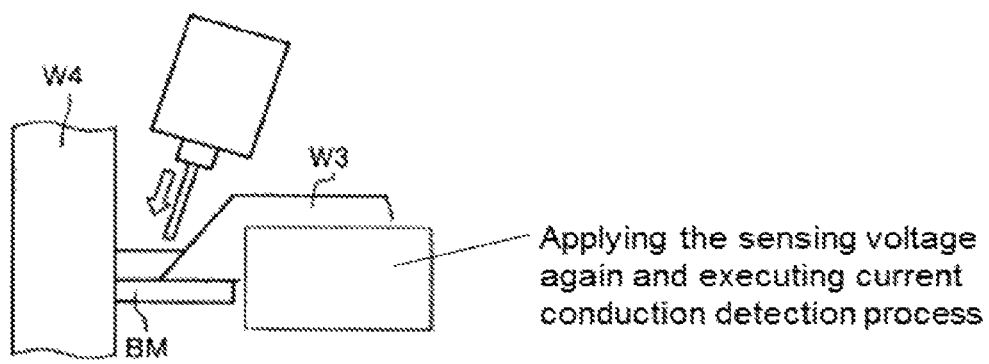
FIG. 18D is a schematic view showing the procedure of the inching operation performed by the welding control device provided in the welding device according to the third embodiment of the invention.
Figure 18E:
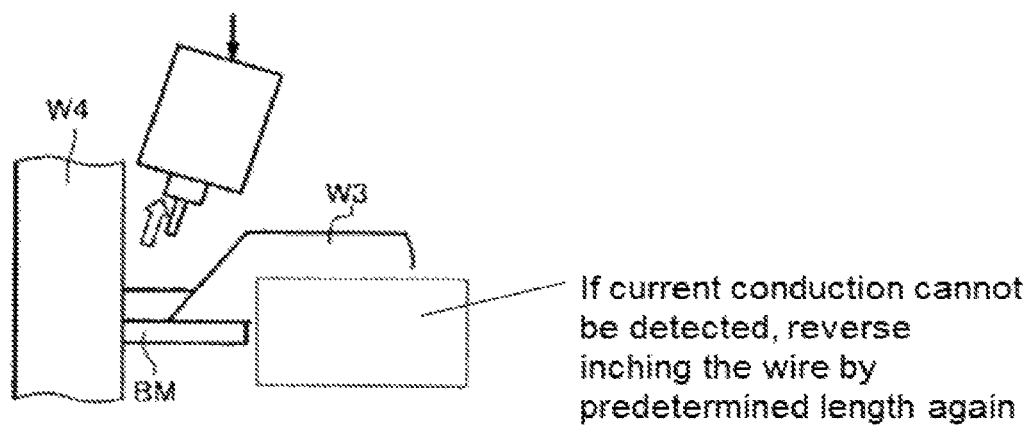
FIG. 18E is a schematic view showing the procedure of the inching operation performed by the welding control device provided in the welding device according to the third embodiment of the invention.
Figure 18F:
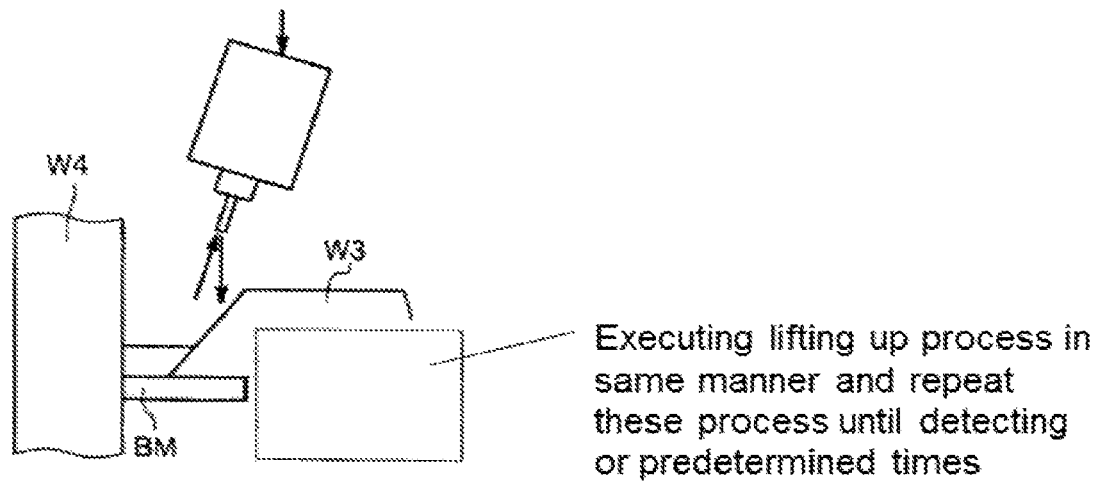
FIG. 18F is a schematic view showing the procedure of the inching operation performed by the welding control device provided in the welding device according to the third embodiment of the invention.

Next, the inching unit 101 moves the welding wire to a position which is different from the aforementioned welding start position and shifted in the XYZ directions by a predetermined distance, for example, a position leaving a wall, for example, by a shift quantity of 0 mm in a weld line advancing direction and a shift quantity of 1 mm in a weld line left/right direction as shown in FIG. 18C. At this position, the inching unit 101 applies the sensing voltage again to perform operation for confirming current conduction, as shown in FIG. 18D. Here, as shown in FIG. 18E, when the current conduction between the welding wire and each steel structure part W3, W4 cannot be detected by the operation for confirming the current conduction, the inching unit 101 performs inching operation on the welding wire again in the opposite direction by the predetermined length. Then, as shown in FIG. 18F, the inching unit 101 lefts up the welding wire, and repeats the operation for confirming the current conduction until the detection of the current conduction or a predetermined number of times set in advance. The aforementioned position which is different from the welding start position is a position near the welding start position but another position than the welding start position, meaning that welding can be started at the position without any problem.

On the other hand, even if the inching operation reaches the maximum wire inching amount, there is a case that the current conduction between the welding wire and each steel structure part W3, W4 cannot be detected during the inching operation of the welding wire. In this case, when the number of retrieving times for the position where the arc can be started exceeds a predetermined one, for example, three, the inching unit 101 concludes that the arc start position cannot be detected, and moves to error processing. Incidentally, description of the error processing will be omitted here.

The welding device 1B having the aforementioned configuration is provided with the inching unit 101 so that whether an arc can be generated or not can be confirmed before the start of welding. Thus, the arc can be started surely at the welding start position.

Fourth Embodiment

Figure 19:
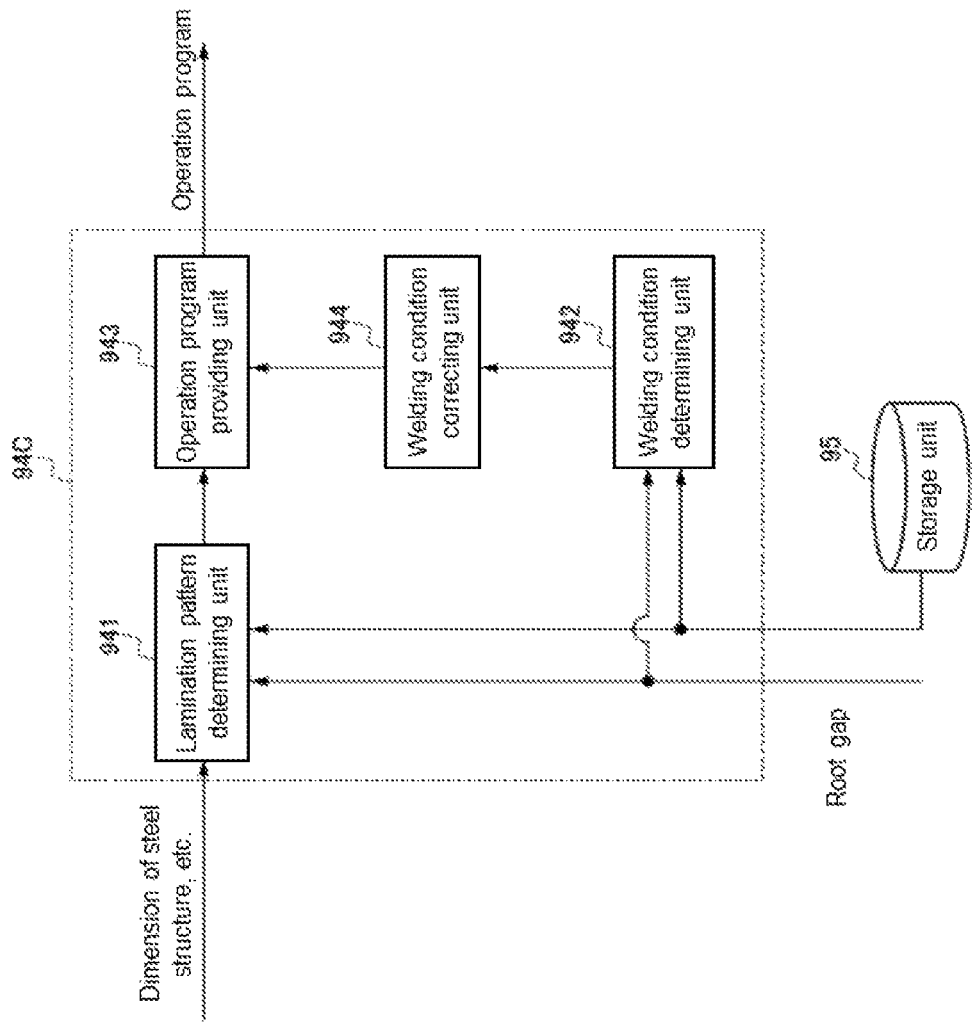
FIG. 19 is a block diagram showing a configuration of an arithmetic unit of a welding control device provided in a welding device according to the fourth embodiment of the invention.

In addition, a welding control device 90C has an arithmetic operation unit 94C in addition to the input unit 91, the sensing unit 92, the root gap calculating unit 93 and the storage unit 95 as shown in the aforementioned FIG. 7. In addition, this arithmetic operation unit 94C has a welding condition correcting unit 944 in addition to the lamination pattern determining unit 941, the welding condition determining unit 942 and the operation program providing unit 943 as shown in FIG. 19. Here, the other configuration than the arithmetic unit 94C in the welding control device 90C and the other configuration than the welding condition correcting unit 944 in the arithmetic operation unit 94C have been already described, and description thereof will be omitted.

The welding condition correcting unit 944 corrects the welding condition determined by the welding condition determining unit 942. Specifically the welding condition correcting unit 944 changes the feeding amount of the welding wire included in the welding condition determined by the welding condition determining unit 942 in order to equalize the welding time from one base point to another when different sectional areas and/or different welding lengths are present in the same workpiece W and hence a plurality of welding joints having different volumes to be welded are welded concurrently by two welding robots 30. Thus, the welding condition correcting unit 944 can compensate the difference in volume to be welded among the welding joints.

Specific processing in the welding condition correcting unit 944 will be described below. Here, preparation is performed as a preliminary stage of the processing in the welding condition correcting unit 944, as follows. First, a relation between a welding current and a proper arc voltage for a wire feeding rate with a predetermined extension is obtained in advance. Next, a relation between the welding current and the proper arc voltage for the wire feeding rate when the extension is increased or decreased is obtained. Then, in a case of the predetermined extension and a reference root gap, welding conditions (i.e., reference welding conditions, that is, a welding current, an arc voltage, a welding speed, and a target position) for each plate thickness are obtained by experiments and so on. Further, a changeable range of the welding current and an arc voltage corresponding thereto are obtained for the pass of welding (or each pass of multilayer welding) (i.e., welding current range). In this case, it is considered that a lamination pattern, a welding current and a welding speed for a thin plate thickness (the same throat thickness among the passes) are often the same as those until the midway of a thick plate thickness. However, the conditions may be set individually for each plate thickness in the same manner as those for a pass near finishing. Those pieces of information are stored in the storage unit 95 so that they can be outputted to the welding condition correcting unit 944, as shown in FIG. 19.

After the preparation is performed thus, the welding condition correcting unit 944 performs processing as follows. First, as for a pass where welding is performed by the two welding robots 30 concurrently, when the throat thickness is fixed on the reference welding conditions after the pass is terminated, that is, when the lamination pattern, the welding current and the welding speed are fixed, the welding condition correcting unit 944 determines an amount of deposited metal required for welding between one base point and another on the assumption that the throat thickness on the reference welding conditions is kept, from the respective reference welding conditions, a root gap of each welding joint, and if there is a pass where welding has been performed before, a throat thickness welded till then. The welding condition correcting unit 944 determines an average value of the amounts of deposited metal determined thus, as an amount of deposited metal to be intended (i.e., an intended amount of deposited metal).

Next, from the relation between the wire feeding rate and the welding current obtained in advance, the welding condition correcting unit 944 determines a welding time corresponding to the intended amount of deposited metal when the current value of the reference welding conditions for the pass is used. In this case, for a straight part of the workpiece W, the welding condition correcting unit 944 calculates the welding speed from the welding length between base points. On the other hand, for an arc part (i.e., corner portion) of the workpiece W, since the welding time corresponds to the rotating time of the rotary positioners 10, the welding condition correcting unit 944 determines a welding length corresponding to the welding position where welding is performed this time, in consideration of a difference from the throat thickness determined till then, and calculates a welding speed (i.e., relative speed between the workpiece W and the welding torch 31). Next, the welding condition correcting unit 944 determines a wire feeding rate required for each welding joint from the determined welding speed and the amount of deposited metal required in the pass for each welding joint, and determines an actual current value and an arc voltage corresponding thereto from the wire melting information.

On the other hand, as for a pass where welding is performed by a plurality of welding robots 30 concurrently, when the throat thickness is varied on the reference welding conditions after the pass is terminated, that is, when the lamination pattern, the welding current and the welding speed are varied, the welding condition correcting unit 944 determines an amount of deposited metal required for welding between one base point and another on the assumption that the throat thickness on the reference welding conditions for each welding joint is kept, from the respective reference welding conditions, a root gap of the welding joint, and if there is a pass where welding has been performed before, a throat thickness welded till then. The welding condition correcting unit 944 determines an average value of the amounts of deposited metal determined thus, as an amount of deposited metal to be intended (i.e., a target amount of deposited metal).

Next, the welding condition correcting unit 944 determines a wire feeding rate for each current value in the path where welding is to be performed concurrently, from the respective reference welding conditions, and determines an average value of wire feeding rates determined thus. The welding condition correcting unit 944 sets the average value as an average wire feeding rate. Next, the welding condition correcting unit 944 determines a welding time in this time from the intended amount of deposited metal and the average wire feeding rate. In this case, for a straight part of the workpiece W, the welding condition correcting unit 944 calculates a welding speed from the welding length between base points and the welding time. On the other hand, for an arc part (i.e., corner portion) of the workpiece W, since the welding time corresponds to the rotating time of the rotary positioners 10, the welding condition correcting unit 944 determines a welding length corresponding to the welding position where welding is performed this time, in consideration of a difference from the throat thickness determined till then, and calculates a welding speed (i.e., relative speed between the workpiece W and the welding torch 31). Next, the welding condition correcting unit 944 determines a wire feeding rate required for each welding joint from the determined welding speed and the amount of deposited metal required in the pass for the welding joint, and determines an actual current value and an arc voltage corresponding thereto from the wire melting information. In this manner, when the feeding amount of the welding wire is changed among a plurality of welding robots 30, a plurality of welding joints having different volumes to be welded can be welded concurrently by the welding robots 30.

Here, the welding condition correcting unit 944 preferably provides a proper welding current range in which welding can be performed in each pass, performs welding within the proper welding current range, and compensates a difference in thickness generated as a result in subsequent passes. In this manner, the welding condition correcting unit 944 corrects a welding condition so that the total thickness can be put within a predetermined value. That is, when the welding current is changed within the predetermined welding current range and welding is performed with a change of thickness, the amount of deposited metal in each pass for each welding joint does not agree with a desired value, but in this case, the shortage of the amount of deposited metal or the excess of the amount of deposited metal is carried forward to the next pass. In addition, when the throat thickness for the present pass is 0 or less, welding is performed with its lower limit value, and the excess of the amount of deposited metal is carried forward to the next pass. Accordingly, the welding condition correcting unit 944 sets an amount determined by adding a carried-forward error to the intended amount of deposited metal, as an amount of deposited metal required in the next pass for the welding joint, and performs similar processing to the aforementioned processing.

In this manner, the welding device according to the fourth embodiment compensates, in a subsequent pass, a difference of thickness generated in welding so as to determine the total thickness within a desired value. Thus, a plurality of welding joints can be welded concurrently efficiently and properly by a plurality of welding robots 30.

In addition, when welding cannot be performed within a proper welding current range where welding can be performed in each pass, it is preferable that the welding condition correcting unit 944 welds the welding joints individually in at least one pass so as to correct the welding condition to thereby compensate the total error in thickness. That is, when the difference in the amount of deposited metal among a plurality of welding joints increases, there is a case where an error occurs in the amount of deposited metal in each welding joint as a result of welding at the termination of all the passes and an intended welding quality cannot be obtained. In this case, the welding condition correcting unit 944 inhibits concurrent welding in one or more passes, that is, inhibits concurrent welding of at least one welding joint of the welding joints, and calculates again the rotating speed (i.e., welding speed) of the rotary positioners 10 in accordance with the remaining amount of deposited metal required before the pass on the assumption of the welding current in the reference welding conditions. Welding is performed based on the welding condition corrected thus. Before or after the welding of this welding joint, welding in this pass for the other welding joints in this case is performed.

In this manner, the welding device according to the fourth embodiment welds the welding joints individually in at least one of the passes so as to compensate the total error of thickness. Thus, even if there is a large difference in volume to be welded between base points among the welding joints, the plural welding joints can be welded concurrently efficiently and properly by the plural welding robots 30.

In addition, when welding cannot be performed within a proper welding current range where welding can be performed in each pass, it is preferable that the welding condition correcting unit 944 changes the welding condition to increase a difference in wire feeding rate to thereby change the extension of the welding wire so that the welding current which may be out of the proper range can be set at a desired value. That is, since the aforementioned welding current range is limited, the number of passes where welding cannot be performed concurrently increases when the difference in the amount of deposited metal increases among the welding joints. When the number of passes where welding cannot be performed concurrently increases thus, the operating time approaches that in a case where the welding joints are welded individually, so as to reduce the effect of the concurrent welding. Accordingly, when the amount of deposited metal cannot be set at a desired value even if the current value is set at its upper or lower limit value, the welding condition correcting unit 944 changes the wire extension to thereby set the amount of deposition at the desired value while keeping the welding current within the proper range. That is, a change in correlation of the welding current and the arc voltage corresponding to a change in the extension is obtained in advance by experiments and so on. The welding condition correcting unit 944 changes the extension so that the welding current value corresponding to the wire feeding amount determined from the welding speed and the amount of deposited metal can be put within the current range. Thus, concurrent welding can be achieved while keeping the proper welding condition.

In this manner, the welding device according to the fourth embodiment changes the extension of the welding wire for each of a plurality of welding robots 30. Thus, the welding joints can be welded by the welding robots 30 concurrently efficiently, with the welding current kept proper.

The welding condition correcting unit 944 outputs the welding condition corrected thus, to the operation program providing unit 943 as shown in FIG. 19. Then the operation program providing unit 943 provides a robot operation program for each welding robot 30 in accordance with the lamination pattern determined by the lamination pattern determining unit 941 and the welding condition corrected by the welding condition correcting unit 944, and outputs the robot operation program to the welding robot 30 so as to set the robot operation program therein.

The welding device 1C configured thus according to the fourth embodiment can automatically provide operation orbits and welding conditions for a plurality of welding robots 30 based on information such as dimensions of the steel structure W inputted to the input unit 91 of the welding control device 90C.

In addition, when the steel structure W is held by the pair of rotary positioners 10 and different straight parts of the steel structure W are welded by welding robots 30 provided on carriages 20 respectively, the welding device 1C according to the fourth embodiment can perform welding by the welding robots 30 without rotating the steel structure W. When different arc parts (i.e., corner portions) of the steel structure W are welded by the welding robots 30 provided on the carriages 20 respectively, the welding device 1C can perform welding by the welding robots 30 while rotating the steel structure W. Thus, the welding device 1C according to the fourth embodiment can weld not only the straight parts of the steel structure W but also the arc parts thereof continuously without disconnecting an arc for welding.

Although the welding device according to the invention has been described specifically along the mode for carrying out the invention, the gist of the invention is not limited to the description. The gist of the invention must be interpreted broadly based on the scope of claims. In addition, not to say, various changes, modifications, etc. based on the description are also included in the gist of the invention.

For example, although the nozzle attaching/detaching mechanism 52 merely serves for attaching/detaching the nozzle 311 of the welding torch 31 as shown in FIG. 5A to FIG. 5C, the nozzle cleaning device 60 may be, for example, arranged to automatically clean an inner surface (i.e., inner circumferential surface) of the removed nozzle 311 with a wire brush or the like. Thus, spatters adhering to the inner surface of the nozzle 311 can be removed so that deterioration in shieldability can be prevented more effectively.

In addition, although the processing method of FIG. 11 has been explained about the case where one welding robot 30 is provided, the method can be applied to a case where a plurality of welding robots 30 are provided.

EXAMPLES

Figure 20A:
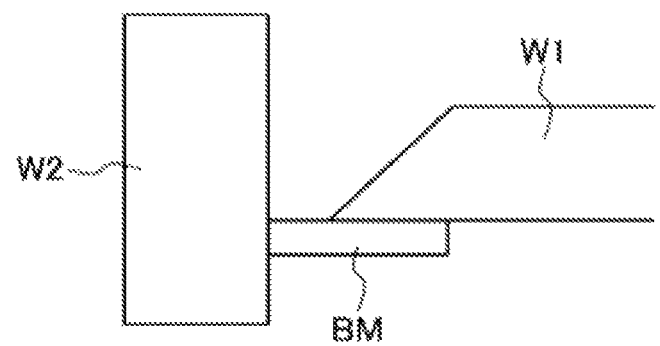
FIG. 20A is a sectional view showing a weld portion in each Example.
Figure 20B:
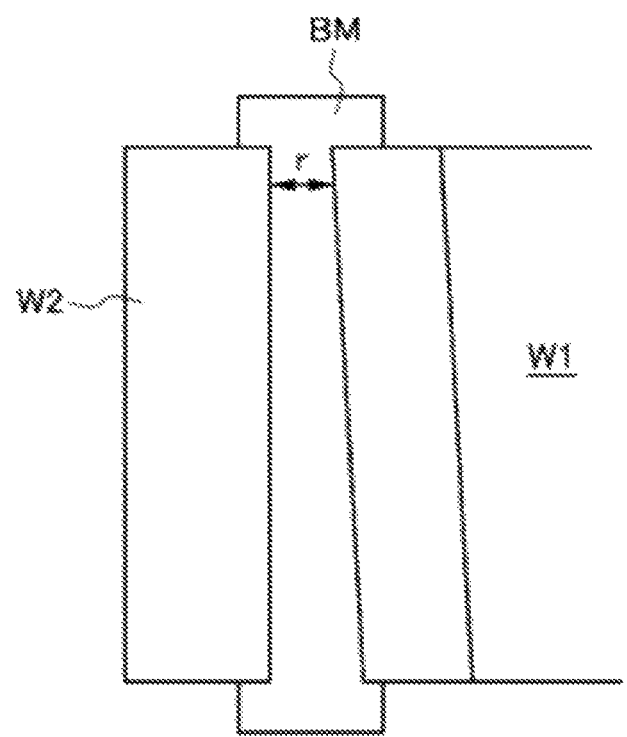
FIG. 20B is a top view of the weld portion in each Example.

To verify the validity of the invention, welding tests where heat input was managed to 30 KJ/cm or less were performed on various conditions where a shielding gas, a welding wire, welding conditions, wire melting information were changed. As shown in FIG. 20A and FIG. 20B, a weld portion had a configuration in which an L-shaped groove was formed to include a column W1, a diagram W2, and a backing member BM provided in a bottom portion of the groove. Further, a root gap r was varied within a range of 6 to 8 mm.

Welding was performed in the following procedure.
1) A root gap is detected by a sensing unit and a root gap calculating unit.
2) Based on wire melting information and the detected root gap, proper conditions are read from a database. The database includes welding conditions not exceeding 30 KJ/cm for each root gap in accordance with a welding wire to be used. A welding condition is extracted from the database in accordance with an inputted plate thickness and the root gap acquired by sensing, and an amount of deposition and an amount of heat input are calculated. For example, welding is not performed on conditions exceeding 30 KJ/cm in a database built with welding conditions for a root gap of 3 mm and welding conditions for a root gap of 4 mm. In addition, a lamination pattern may be automatically provided so that the amount of deposition can be controlled. Incidentally, in the present Examples, proper conditions differ from one root gap to another. Therefore, description of the lamination pattern is omitted.
3) Welding is performed automatically following the conditions (i.e., lamination pattern and welding conditions) provided based on the database read out.

The database in the present Examples includes ones within the proper range described in the embodiment and ones out of the proper range, as to the welding wire composition, the wire diameter, the wire extension, or the ratio of the proper current/the feeding rate.

Bead appearance as welding quality was evaluated visually in the following criteria as to welding shape defects such as overlap, undercut, etc. in weld portions.

undercut: "○" no undercut, and "Δ" undercut not regarded as defect (i.e., 0.5 mm or less deep and 20 mm or less long)

overlap: "○" no overlap, and "Δ" overlap not regarded as defect (i.e., 0.5 mm or less deep and 20 mm or less long)

In addition, slag removability and spatters as welding quality were evaluated in the following criteria.

slag removability: "○" 90% or more of slag removed using the slag removing device, and "Δ" 80% or more of slag removed using the slag removing device (background-art level)

spatters: "○" adhesion of no spatter 1 mm or more large to a steel plate, and "Δ" adhesion of 10 or less spatters 1 mm or more large (background-art level)

When the ratio of the proper current/the feeding rate is high, the current value becomes high. When the welding current or the welding speed is increased excessively, undercut or spatters may be caused by swinging down with arc force. On the other hand, when the ratio of the proper current/the feeding rate is low, the current value becomes low. Thus, excessive molten metal may be hung down due to gravity, causing overlap. An average of ratios to feeding rates at 150 A and 300 A is set as the ratio of the proper current/the feeding rate.

Test results are shown in Table 1 and Table 2 together with respective welding conditions. As the shielding gas, 100% $CO_2$ gas was used in Test Nos. 1 to 13, 15 to 47 and 50 to 51, 98% Ar+2% $O_2$ gas was used in Test No. 14, and 80% Ar+20% $CO_2$ gas was used in Test Nos. 14 and 49. In addition, as for the current waveform, a pulse system was used in Test Nos. 14 and 49, and a constant voltage system was used in the other tests. Further, a flux cored wire was used in Test Nos. 16, 17 and 50, and a solid wire was used in any other test.

TABLE 1

| | | | | Welding wire | | | | | | |
| | | | | Wire composition (mass %) ("—" not forcedly added) (the balance Fe and impurities) | | | | | | |
| No. | Shielding gas | Wire type | Current waveform | C | Si | Mn | S | Ti | Al | Mo |
|---|---|---|---|---|---|---|---|---|---|---|
| 1 | 100% $CO_2$ | solid | CV | 0.02 | 0.80 | 1.55 | 0.0120 | 0.25 | — | — |
| 2 | 100% $CO_2$ | solid | CV | 0.02 | 0.80 | 1.55 | 0.0120 | 0.25 | — | — |
| 3 | 100% $CO_2$ | solid | CV | 0.02 | 0.80 | 1.55 | 0.0120 | 0.25 | — | — |

TABLE 1-continued

| No. | Shielding gas | Wire type | Current waveform | C | Si | Mn | S | Ti | Al | Mo |
|---|---|---|---|---|---|---|---|---|---|---|
| 4 | 100% CO₂ | solid | CV | 0.02 | 0.80 | 1.55 | 0.0120 | 0.25 | — | — |
| 5 | 100% CO₂ | solid | CV | 0.02 | 0.80 | 1.55 | 0.0120 | 0.25 | — | — |
| 6 | 100% CO₂ | solid | CV | 0.02 | 0.80 | 1.55 | 0.0120 | 0.25 | — | — |
| 7 | 100% CO₂ | solid | CV | 0.02 | 0.80 | 1.55 | 0.0120 | 0.25 | — | — |
| 8 | 100% CO₂ | solid | CV | 0.02 | 0.80 | 1.55 | 0.0120 | 0.25 | — | — |
| 9 | 100% CO₂ | solid | CV | 0.02 | 0.80 | 1.55 | 0.0120 | 0.25 | — | — |
| 10 | 100% CO₂ | solid | CV | 0.02 | 0.80 | 1.55 | 0.0120 | 0.25 | — | — |
| 11 | 100% CO₂ | solid | CV | 0.02 | 0.80 | 1.55 | 0.0120 | 0.25 | — | — |
| 12 | 100% CO₂ | solid | CV | 0.02 | 0.80 | 1.55 | 0.0120 | 0.25 | — | — |
| 13 | 100% CO₂ | solid | CV | 0.02 | 0.80 | 1.55 | 0.0120 | 0.25 | — | — |
| 14 | 98% Ar + 2% O₂ | solid | pulse | 0.02 | 0.70 | 1.82 | 0.0090 | — | — | — |
| 15 | 100% CO₂ | solid | CV | 0.02 | 0.70 | 1.82 | 0.0090 | — | — | — |
| 16 | 100% CO₂ | FCW | CV | 0.02 | 1.20 | 2.2 | 0.0090 | — | — | — |

| | Welding wire | | | | Wire melting information | | |
|---|---|---|---|---|---|---|---|
| | Wire composition (mass %) ("—" not forcedly added) (the balance Fe and impurities) | | | | | Wire protruding length | Wire | Proper current/ feeding |
| No. | Cr | Ni | Cu | B | $Si/\{1 + (Al + Ti)\}$ | (mm) | diameter | rate |
| 1 | — | — | — | — | 0.64 | 25 | 1.2 | 27.8 |
| 2 | — | — | — | — | 0.64 | 20 | 1.2 | 30.5 |
| 3 | — | — | — | — | 0.64 | 15 | 1.2 | 34.4 |
| 4 | — | — | — | — | 0.64 | 10 | 1.2 | 39.4 |
| 5 | — | — | — | — | 0.64 | 35 | 1.2 | 24.2 |
| 6 | — | — | — | — | 0.64 | 38 | 1.2 | 23.3 |
| 7 | — | — | — | — | 0.64 | 8 | 1.2 | 39.2 |
| 8 | — | — | — | — | 0.64 | 25 | 1.4 | 42.9 |
| 9 | — | — | — | — | 0.64 | 25 | 1.6 | 78.9 |
| 10 | — | — | — | — | 0.64 | 25 | 1.0 | 21.0 |
| 11 | — | — | — | — | 0.64 | 25 | 0.9 | 19.9 |
| 12 | — | — | — | — | 0.64 | 25 | 2.0 | 111.3 |
| 13 | — | — | — | — | 0.64 | 25 | 2.4 | 190.5 |
| 14 | 20.0 | 12.2 | — | — | 0.70 | 15 | 1.0 | 24.2 |
| 15 | 20.0 | 12.2 | — | — | 0.70 | 25 | 1.2 | 18.7 |
| 16 | 25.0 | 20.0 | — | — | 1.20 | 30 | 1.2 | 12.3 |

| | Evaluation | | | |
|---|---|---|---|---|
| | Heat input management | Quality after welding | | |
| No. | (30 kJ/cm or less) | Bead appearance | Slag removability | Spatter |
| 1 | ○ | ○ | ○ | ○ |
| 2 | ○ | ○ | ○ | ○ |
| 3 | ○ | ○ | ○ | ○ |
| 4 | ○ | ○ | ○ | ○ |
| 5 | ○ | ○ | ○ | ○ |
| 6 | ○ | Δ*1 | ○ | Δ |
| 7 | ○ | Δ*2 | ○ | Δ |
| 8 | ○ | ○ | ○ | ○ |
| 9 | ○ | ○ | ○ | ○ |
| 10 | ○ | ○ | ○ | ○ |
| 11 | ○ | Δ*1 | ○ | Δ |
| 12 | ○ | ○ | ○ | ○ |
| 13 | ○ | Δ*2 | ○ | Δ |
| 14 | ○ | ○ | ○ | ○ |
| 15 | ○ | ○ | ○ | ○ |
| 16 | ○ | ○ | ○ | ○ |

| | | | | Welding wire | | | | | | |
|---|---|---|---|---|---|---|---|---|---|---|
| | | | | Wire composition (mass %) ("—" not forcedly added) (the balance Fe and impurities) | | | | | | |
| | Shielding | Wire | Current | | | | | | | |
| No. | gas | type | waveform | C | Si | Mn | S | Ti | Al | Mo |
| 17 | 100% CO₂ | FCW | CV | 0.02 | 1.20 | 2.2 | 0.0090 | — | — | — |
| 18 | 100% CO₂ | solid | CV | 0.02 | 0.20 | 0.2 | 0.0090 | — | — | — |
| 19 | 100% CO₂ | solid | CV | 0.48 | 0.80 | 1.55 | 0.0120 | — | — | — |
| 20 | 100% CO₂ | solid | CV | 0.62 | 0.80 | 1.55 | 0.0120 | — | — | — |
| 21 | 100% CO₂ | solid | CV | 0.02 | 0.10 | 1.23 | 0.0120 | — | — | — |
| 22 | 100% CO₂ | solid | CV | 0.02 | — | 1.23 | 0.0120 | — | — | — |
| 23 | 100% CO₂ | solid | CV | 0.02 | 2.00 | 1.55 | 0.0120 | — | — | — |

TABLE 1-continued

| No. | Shielding gas | Wire type | Current waveform | C | Si | Mn | S | Ti | Al | Mo |
|---|---|---|---|---|---|---|---|---|---|---|
| 24 | 100% $CO_2$ | solid | CV | 0.02 | 2.10 | 1.83 | 0.0090 | — | — | — |
| 25 | 100% $CO_2$ | solid | CV | 0.02 | 0.80 | 0.10 | 0.0120 | — | — | — |
| 26 | 100% $CO_2$ | solid | CV | 0.02 | 0.80 | — | 0.0090 | — | — | — |
| 27 | 100% $CO_2$ | solid | CV | 0.02 | 0.80 | 3.00 | 0.0090 | — | — | — |
| 28 | 100% $CO_2$ | solid | CV | 0.02 | 0.80 | 3.20 | 0.0090 | — | — | — |
| 29 | 100% $CO_2$ | solid | CV | 0.02 | 0.80 | 1.55 | 0.0490 | — | — | — |
| 30 | 100% $CO_2$ | solid | CV | 0.02 | 0.80 | 1.55 | 0.0630 | — | — | — |
| 31 | 100% $CO_2$ | solid | CV | 0.02 | 0.80 | 1.55 | 0.0120 | 0.80 | — | — |
| 32 | 100% $CO_2$ | solid | CV | 0.02 | 0.80 | 1.55 | 0.0120 | 0.98 | — | — |

| | Welding wire | | | | Wire melting information | | |
|---|---|---|---|---|---|---|---|
| | Wire composition (mass %) ("—" not forcedly added) (the balance Fe and impurities) | | | | | Wire protruding length | | Proper current/ feeding |
| No. | Cr | Ni | Cu | B | Si/{1 + (Al + Ti)} | (mm) | Wire diameter | rate |
| 17 | 25.0 | 20.0 | — | — | 1.20 | 35 | 1.2 | 10.3 |
| 18 | — | — | — | — | 0.20 | 15 | 1.6 | 120.2 |
| 19 | — | — | — | — | 0.80 | 25 | 1.2 | 27.3 |
| 20 | — | — | — | — | 0.80 | 25 | 1.2 | 26.9 |
| 21 | — | — | — | — | 0.10 | 25 | 1.2 | 31.4 |
| 22 | — | — | — | — | 0.00 | 25 | 1.2 | 32.9 |
| 23 | — | — | — | — | 2.00 | 25 | 1.2 | 26.6 |
| 24 | — | — | — | — | 2.10 | 25 | 1.2 | 26.2 |
| 25 | — | — | — | — | 0.80 | 25 | 1.2 | 30.6 |
| 26 | — | — | — | — | 0.80 | 25 | 1.2 | 31.8 |
| 27 | — | — | — | — | 0.80 | 25 | 1.2 | 26.2 |
| 28 | — | — | — | — | 0.80 | 25 | 1.2 | 25.4 |
| 29 | — | — | — | — | 0.80 | 25 | 1.2 | 29.2 |
| 30 | — | — | — | — | 0.80 | 25 | 1.2 | 28.7 |
| 31 | — | — | — | — | 0.44 | 25 | 1.2 | 29.4 |
| 32 | — | — | — | — | 0.40 | 25 | 1.2 | 29.0 |

| | Evaluation | | | |
|---|---|---|---|---|
| | Heat input management | Quality after welding | | |
| No. | (30 kJ/cm or less) | Bead appearance | Slag removability | Spatter |
| 17 | ○ | Δ*1 | ○ | Δ |
| 18 | ○ | ○ | ○ | ○ |
| 19 | ○ | ○ | ○ | ○ |
| 20 | ○ | ○ | ○ | Δ |
| 21 | ○ | ○ | ○ | ○ |
| 22 | ○ | ○ | Δ | ○ |
| 23 | ○ | ○ | ○ | ○ |
| 24 | ○ | Δ | Δ | ○ |
| 25 | ○ | ○ | ○ | ○ |
| 26 | ○ | ○ | ○ | Δ |
| 27 | ○ | ○ | ○ | ○ |
| 28 | ○ | ○ | Δ | ○ |
| 29 | ○ | ○ | ○ | ○ |
| 30 | ○ | ○ | Δ | Δ |
| 31 | ○ | ○ | ○ | ○ |
| 32 | ○ | ○ | Δ | ○ |

*1 overlap not requiring correction,
*2 undercut not requiring correction

TABLE 2

| | Welding wire | | | | | | | | | |
|---|---|---|---|---|---|---|---|---|---|---|
| | | | | Wire composition (mass %) ("—" not forcedly added) (the balance Fe and impurities) | | | | | | |
| No. | Shielding gas | Wire type | Current waveform | C | Si | Mn | S | Ti | Al | Mo |
| 33 | 100% $CO_2$ | solid | CV | 0.02 | 0.80 | 1.55 | 0.0040 | 0.20 | 0.20 | — |
| 34 | 100% $CO_2$ | solid | CV | 0.02 | 0.20 | 1.55 | 0.0040 | 0.77 | 0.65 | — |
| 35 | 100% $CO_2$ | solid | CV | 0.02 | 0.80 | 1.55 | 0.0040 | 0.20 | 0.78 | — |
| 36 | 100% $CO_2$ | solid | CV | 0.02 | 0.80 | 1.55 | 0.0040 | 0.20 | 0.85 | — |
| 37 | 100% $CO_2$ | solid | CV | 0.02 | 0.80 | 1.55 | 0.0040 | 0.20 | — | — |

TABLE 2-continued

| No. | | | | Si/{1 + (Al + Ti)} | Wire protruding length (mm) | Wire diameter | Proper current/ feeding rate |
|---|---|---|---|---|---|---|---|
| 38 | 100% CO$_2$ | solid | CV | 0.02 | 0.80 | 2.22 | 0.0040 | 0.20 | — | — |
| 39 | 100% CO$_2$ | solid | CV | 0.02 | 0.80 | 1.7 | 0.0090 | 0.20 | — | 5.00 |
| 40 | 100% CO$_2$ | solid | CV | 0.02 | 0.80 | 1.78 | 0.0090 | 0.20 | — | 1.50 |
| 41 | 100% CO$_2$ | solid | CV | 0.02 | 0.80 | 1.7 | 0.0090 | 0.20 | — | 6.30 |
| 42 | 100% CO$_2$ | solid | CV | 0.02 | 0.80 | 1.7 | 0.0090 | 0.20 | — | — |
| 43 | 100% CO$_2$ | solid | CV | 0.02 | 0.80 | 1.7 | 0.0090 | 0.20 | — | — |
| 44 | 100% CO$_2$ | solid | CV | 0.02 | 0.80 | 1.7 | 0.0090 | 0.20 | — | — |
| 45 | 100% CO$_2$ | solid | CV | 0.02 | 0.80 | 1.7 | 0.0090 | 0.20 | — | — |
| 46 | 100% CO$_2$ | solid | CV | 0.02 | 0.80 | 1.7 | 0.0090 | 0.20 | — | — |
| 47 | 100% CO$_2$ | solid | CV | 0.02 | 0.80 | 1.7 | 0.0090 | 0.20 | — | — |
| 48 | 80% Ar + 20% CO$_2$ | solid | CV | 0.02 | 0.80 | 1.7 | 0.0090 | 0.20 | — | — |
| 49 | 80% Ar + 20% CO$_2$ | solid | pulse | 0.02 | 0.80 | 1.7 | 0.0090 | 0.20 | — | — |
| 50 | 100% CO$_2$ | FCW | CV | 0.02 | 0.80 | 1.7 | 0.0090 | 0.20 | — | — |
| 51 | 100% CO$_2$ | solid | CV | 0.02 | 0.20 | 1.7 | 0.0090 | 0.95 | 0.85 | — |

| | Welding wire | | | | | Wire melting information | |
|---|---|---|---|---|---|---|---|
| | Wire composition (mass %) ("—" not forcedly added) (the balance Fe and impurities) | | | | Si/{1 + (Al + Ti)} | Wire protruding length (mm) | Wire diameter | Proper current/ feeding rate |
| No. | Cr | Ni | Cu | B | | | | |
| 33 | — | — | — | — | 0.57 | 25 | 1.2 | 28.7 |
| 34 | — | — | — | — | 0.08 | 25 | 1.2 | 28.3 |
| 35 | — | — | — | — | 0.40 | 25 | 1.2 | 28.8 |
| 36 | — | — | — | — | 0.39 | 25 | 1.2 | 28.6 |
| 37 | 30.0 | 11.0 | — | — | 0.67 | 25 | 1.2 | 19.5 |
| 38 | 35.0 | 12.0 | — | — | 0.67 | 25 | 1.2 | 18.3 |
| 39 | 5.0 | — | — | — | 0.67 | 25 | 1.2 | 24.6 |
| 40 | 2.0 | — | — | — | 0.67 | 25 | 1.2 | 26.7 |
| 41 | 2.0 | — | — | — | 0.67 | 25 | 1.2 | 23.6 |
| 42 | 20.0 | 22.0 | — | — | 0.67 | 25 | 1.2 | 20.3 |
| 43 | — | — | 0.20 | — | 0.67 | 25 | 1.2 | 28.9 |
| 44 | — | — | 1.00 | — | 0.67 | 25 | 1.2 | 31.6 |
| 45 | — | — | — | 0.0030 | 0.67 | 25 | 1.2 | 29.5 |
| 46 | — | — | — | 0.0100 | 0.67 | 25 | 1.2 | 29.0 |
| 47 | — | — | — | 0.0120 | 0.67 | 25 | 1.2 | 29.5 |
| 48 | — | — | — | — | 0.67 | 25 | 1.2 | 31.3 |
| 49 | — | — | — | — | 0.67 | 25 | 1.2 | 22.7 |
| 50 | — | — | — | — | 0.67 | 25 | 1.2 | 22.8 |
| 51 | — | — | — | — | 0.07 | 8 | 1.0 | 29.8 |

| | Evaluation | | | |
|---|---|---|---|---|
| | Heat input management | Quality after welding | | |
| No. | (30 kJ/cm or less) | Bead appearance | Slag removability | Spatter |
| 33 | ○ | ○ | ○ | ○ |
| 34 | ○ | ○ | Δ | ○ |
| 35 | ○ | ○ | ○ | ○ |
| 36 | ○ | ○ | Δ | ○ |
| 37 | ○ | ○ | ○ | ○ |
| 38 | ○ | ○ | Δ | ○ |
| 39 | ○ | ○ | ○ | ○ |
| 40 | ○ | ○ | ○ | ○ |
| 41 | ○ | ○ | Δ | ○ |
| 42 | ○ | ○ | Δ | ○ |
| 43 | ○ | ○ | ○ | ○ |
| 44 | ○ | ○ | ○ | ○ |
| 45 | ○ | ○ | ○ | ○ |
| 46 | ○ | ○ | ○ | ○ |
| 47 | ○ | Δ*1 | Δ | ○ |
| 48 | ○ | ○ | ○ | ○ |
| 49 | ○ | ○ | ○ | ○ |
| 50 | ○ | ○ | ○ | ○ |
| 51 | ○ | Δ*2 | Δ | Δ |

*1 overlap not requiring correction,
*2 undercut not requiring correction

In Test Nos. 1 to 13 shown in Table 1, evaluation was performed with welding wires having the same composition while changing the wire extension, the wire diameter and the ratio of the proper current/the feeding rate. In Test No. 6 and 7 where the wire extension was out of the range of 10 to 35 mm, both the bead appearance and the spatter were evaluated as "Δ". In addition, in Test Nos. 11 and 13 where the wire extension was out of the range of 1.0 to 2.0 mm, both the bead appearance and the spatter were evaluated as "Δ". In Test No. 13, the ratio of the proper current/the feeding rate was also out of the range of 12 to 125.

On the other hand, in Test Nos. 1 to 5, 8 to 10 and 12 where the wire diameter, the wire extension and the ratio of the proper current/the feeding rate were within the range of 1.0 to 2.0 mm, the range of 10 to 35 mm and the range of 12 to 125 respectively, good welding quality was obtained.

Of Test Nos. 14 to 17 where a SUS welding wire was used, in Test Nos. 14 to 16, good quality was obtained. However, in Test No. 17 where the ratio of the proper current/the feeding rate was less than 12, both the bead appearance and the spatter were evaluated as "Δ".

In Test No. 20 where the content of C exceeded 0.50 mass %, the spatter was evaluated as "Δ". In Test No. 22 where Si was not contained, Si/{1+(Al+Ti)} was 0, and in this case the slag removability was evaluated as "Δ". In Test No. 24 where the content of Si was 2.10 mass % exceeding 2.00 mass %, slag crowded in a toe portion so that the slag were hardly removed, with the result that the slag removability was evaluated as "Δ".

In Test No. 26 where Mn was not contained, the spatter was evaluated as "Δ". In Test No. 28 where the content of Mn exceeded 3.00 mass %, the slag removability was evaluated as "Δ". In Test No. 30 where the content of S exceeded 0.0500 mass %, both the spatter and the slag removability were evaluated as "Δ".

In Test Nos. 32 and 51 where the content of Ti exceeded 0.80 mass %, the slag removability was evaluated as "Δ". In Test No. 51 where further the content of Al exceeded 0.80 mass % and Si/{1+(Al+Ti)} was less than 0.10, the bead appearance (undercut) and the spatter were also evaluated as "Δ".

In each of Test No. 36 where the content of Al exceeded 0.80 mass %, Test No. 38 where the content of Cr exceeded 30.0 mass %, Test No. 41 where the content of Mo exceeded 5.0 mass %, and Test No. 42 where the content of Ni exceeded 20.0 mass %, the slag removability was evaluated as "Δ". Further, in Test No. 47 where the content of B exceeded 0.0100 mass %, the bead appearance (overlap) and the slag removability were evaluated as "Δ".

In Test No. 34 where the composition of the welding wire was within the proper range but Si/{1+(Al+Ti)} was less than 0.10, the slag removability was evaluated as "Δ".

On the other hand, in Test Nos. 1 to 5, 8 to 10, 12, 14 to 16, 18, 19, 21, 23, 25, 27, 29, 31, 33, 35, 37, 39, 40, 43 to 46, and 48 to 50, where the composition of the welding wire, Si/{1+(Al+Ti)}, the wire extension, the wire diameter, and the ratio of the proper current/the feeding rate were within the proper ranges respectively, good results were obtained.

The present application is based on a Japanese patent application (Japanese Patent Application No. 2016-147868) filed on Jul. 27, 2016, the contents of which are incorporated herein by reference.

DESCRIPTION OF REFERENCE NUMERALS AND SIGNS 1, 1A, 1B, 1C welding device
10 rotary positioner
11 annular holding member
20 carriage
30 welding robot
31 welding torch
50 nozzle exchanging device
60 nozzle cleaning device
70 slag removing device
80 wire cutting device
90, 90A, 90B, 90C welding control device
91 input unit
92 sensing unit (laser sensor)
93 root gap calculating unit
95 storage unit
111 fixing jig
132 driving member
311 nozzle
521 coil spring
524 rotary drive source
C groove depth
H amount of heat input
$P_S$ detection start position
$P_5$ detection position of predetermined depth relative to set groove depth from workpiece surface
r distance (root gap)
W, W1, W2, W3, W4 steel structure (workpiece)
W1a, W2a groove face
θ1, θ2 angle of groove face

The invention claimed is:

1. A welding device for automatically welding a workpiece by a welding robot using a welding wire, comprising a welding control device that controls operation and welding work of the welding robot, the welding control device including:
a sensing unit configured to detect a position of the workpiece; and
a storage unit including wire melting information as a database of a proper welding current corresponding to a feeding rate for each of the welding wire,
wherein the welding control device is configured to calculate a root gap based on data of detected positions of both groove faces in a groove width direction from a detection position of a predetermined depth relative to a set groove depth from at least one surface of the workpiece, the data of detected positions of the both groove faces being detected by the sensing unit, a difference between the set groove depth and a detection start position, and preset angles of both of the groove faces,
wherein a lamination pattern and a welding condition are provided in accordance with the root gap and the wire melting information so that an amount of heat input is equal to or less than a predetermined amount of heat input,
wherein the wire melting information includes information about a diameter of the welding wire, information about a wire extension, gas information about a shielding gas, and the wire melting information includes a database of a proper welding current corresponding to a feeding rate for each of the welding wire within a welding wire diameter range of 1.0 to 2.0 mm and a wire extension range of 10 to 35 mm, and
wherein the sensing unit detects the position of the workpiece with a laser sensor, or detects the position of the workpiece by applying a sensing voltage between a welding torch supporting the welding wire set to have the predetermined extension and the workpiece, and detecting a current conduction state caused by contact between the welding wire and the workpiece.

2. The welding device according to claim 1, wherein the wire melting information is set within a range of "12≤{proper welding current (A)/feeding rate (m/min)}≤125" for each of the welding wire.

3. The welding device according to claim 1,
wherein the wire melting information includes information of a composition of the welding wire,
the welding wire containing, based on total weight of the welding wire,
C: 0.50 mass % or less (including 0%),
Si: 0.10 to 2.00 mass %,
Mn: 0.10 to 3.00 mass %,
S: 0.0001 to 0.0500 mass %,
Ti: 0.80 mass % or less (including 0%),
Al: 0.80 mass % or less (including 0%),
Mo: 5.0 mass % or less (including 0%),
Cr: 30.0 mass % or less (including 0%),
Ni: 20.0 mass % or less (including 0%),
Cu: 1.0 mass % or less (including 0%),
B: 0.0100 mass % or less (including 0%).

4. The welding device according to claim 3,
wherein a ratio between Si, Al and Ti which are contained in the welding wire satisfies the following relationship of "$0.10 \leq Si/\{1+(Al+Ti)\}$".

5. The welding device according to claim 1, further comprising:
a pair of rotary positioners that is provided movably in a longitudinal direction of the workpiece and holds and rotates the workpiece;
a carriage or a plurality of carriages, provided movably in a parallel direction to the direction in which the pair of the rotary positioners move;
the welding robot, provided on the carriage movably in a perpendicular direction to the direction in which the rotary positioners move; and
a welding torch, provided at an end of the welding robot, wherein:
the pair of rotary positioners includes:
a pair of annular holding members that receive the workpiece internally and hold the workpiece with a plurality of fixing jigs; and
a driving member that rotates one or both of the pair of annular holding members; and
each of the annular holding members is divided at a predetermined position of an annular portion to form a part of the annular portion to be open, so that the workpiece can be received in the annular holding members.

6. The welding device according to claim 5,
wherein when a plurality of welding joints having different volumes to be welded due to different sectional areas of the workpiece or different welding lengths of the workpiece or both of them are welded concurrently by a plurality of the welding robot, a feeding amount of the welding wire is controlled to be changed to compensate the difference in the volume to be welded in order to equalize a welding time from a base point to a next base point.

7. The welding device according to claim 6,
wherein when welding cannot be performed within a range of a welding current with which welding can be performed in each of passes, the welding control device makes control to weld the welding joints individually in at least one of the passes so that a total error in thickness is compensated.

8. The welding device according to claim 6,
wherein the welding control device sets a range of a welding current with which welding can be performed in each of passes, performs welding within the range in the pass, and makes control to compensate a difference in amount of deposition generated as a result of the welding in another following pass, so that a total amount of deposition is within a desired range.

9. The welding device according to claim 8,
wherein when welding cannot be performed within a range of a welding current with which welding can be performed in each of passes, the welding control device makes control to increase a difference in wire feeding amount and to change an extension of the welding wire so that a welding current being out of the proper range is set at a desired value.

10. The welding device according to claim 1, further comprising a slag removing device provided at an end of the welding robot, the slag removing device removing a slag generated in a weld portion of the workpiece.

11. The welding device according to claim 1, further comprising a nozzle exchanging device that exchanges a nozzle provided at an end of a welding torch, the nozzle exchanging device including:
a coil spring to which the nozzle can be inserted; and
a rotary drive source that rotationally drives the coil spring, to which the nozzle is inserted, around a central axis of the coil spring, so as to remove the nozzle from a torch body of the welding torch.

12. The welding device according to claim 1,
wherein when multilayer welding is performed on a plurality of weld portions in the workpiece, welding of each layer is dividedly performed in each of the weld portions in a predetermined order.

13. The welding device according to claim 1,
wherein the welding control device includes at least an input unit to which at least one or both of dimensions of the workpiece and a shape of a welding joint, and information about whether welding can be executed or not are inputted through input by a worker or through input of CAD data of the workpiece, and
the welding control device automatically provides a welding robot operation orbit and a welding condition for welding, based on a welding robot orbit and a welding condition prepared in advance in accordance with at least one or both of the dimensions of the workpiece and the shape of the welding, joint, and performs welding.

14. A welding device for automatically welding a workpiece by a welding robot using a welding wire, comprising
a welding control device that controls operation and welding work of the welding robot, the welding control device including:
a sensing unit configured to detect a position of the workpiece; and
a storage unit including wire melting information as a database of a proper welding current corresponding to a feeding rate for each of the welding wire,
wherein the welding control device is configured to calculate a root gap based on data of detected positions of both groove faces in a a groove width direction from a detection position of a predetermined depth relative to a set groove depth from at least one surface of the workpiece, the data of detected positions of the both groove faces being detected by the sensing unit, a difference between the set groove depth and a detection start position, and preset angles of both of the groove faces,
wherein a lamination pattern and a welding condition are provided in accordance with the root gap and the wire melting information so that an amount of heat input is equal to or less than a predetermined amount of heat input, and wherein the welding device further comprises:
- a pair of rotary positioners that is provided movably in a longitudinal direction of the workpiece and holds and rotates the workpiece;
- a carriage or a plurality of carriages, provided movably in a parallel direction to the direction in which the pair of the rotary positioners move;
- the welding robot, provided on the carriage movably in a perpendicular direction to the direction in which the rotary positioners move; and
- a welding torch, provided at an end of the welding robot, wherein the pair of rotary positioners includes:
- a pair of annular holding members that receive the workpiece internally and hold the workpiece with a plurality of fixing jigs; and
- a driving member that rotates one or both of the pair of annular holding members; and wherein each of the annular holding members is divided at a predetermined position of an annular portion to form a part of the annular portion to be open, so that the workpiece can be received in the annular holding members.

15. The welding device according to claim 14, wherein when a plurality of welding joints having different volumes to be welded due to different sectional areas of the workpiece or different welding lengths of the workpiece or both of them are welded concurrently by a plurality of the welding robot, a feeding amount of the welding wire is controlled to be changed to compensate the difference in the volume to be welded in order to equalize a welding time from a base point to a next base point.

16. The welding device according to claim 15, wherein the welding control device sets a range of a welding current with which welding can be performed in each of passes, performs welding within the range in the pass, and makes control to compensate a difference in amount of deposition generated as a result of the welding in another following pass, so that a total amount of deposition is within a desired range.

17. The welding device according to claim 15, wherein when welding cannot be performed within a range of a welding current with which welding can be performed in each of passes, the welding control device makes control to weld the welding joints individually in at least one of the passes so that a total error in thickness is compensated.

18. The welding device according to claim 16, wherein when welding cannot be performed within a range of a welding current with which welding can be performed in each of passes, the welding control device makes control to increase a difference in wire feeding amount and to change an extension of the welding wire so that a welding current being out of the proper range is set at a desired value.

* * * * *